US011992455B1

(12) United States Patent
Akiona et al.

(10) Patent No.: US 11,992,455 B1
(45) Date of Patent: May 28, 2024

(54) USER ADJUSTMENT OF ROBOTIC MASSAGE

(71) Applicant: Aescape, Inc., New York, NY (US)

(72) Inventors: Nicholas Akiona, New York, NY (US); Taya Quandt, New Canaan, CT (US); Eric A. Litman, Brooklyn, NY (US); Anchit Sood, Jersey City, NJ (US)

(73) Assignee: Aescape, Inc., New York, NY (US)

( * ) Notice: Subject to any disclaimer, the term of this patent is extended or adjusted under 35 U.S.C. 154(b) by 0 days.

(21) Appl. No.: 18/144,643

(22) Filed: May 8, 2023

(51) Int. Cl.
*A61H 1/00* (2006.01)
*A61H 7/00* (2006.01)

(52) U.S. Cl.
CPC ..... *A61H 7/004* (2013.01); *A61H 2201/5007* (2013.01); *A61H 2201/5038* (2013.01)

(58) Field of Classification Search
CPC ........ B25J 9/1633; B25J 9/106; B25J 9/1664; B25J 11/00; A61H 99/00; A61H 2201/1659; A61H 7/004; A61H 2201/5007; A61H 2201/5038; G16H 20/30; G16H 50/20; G16H 50/50
See application file for complete search history.

(56) References Cited

U.S. PATENT DOCUMENTS 5,023,808 A 6/1991 Seraji
6,526,373 B1 2/2003 Barral
6,832,991 B1 * 12/2004 Inada ................ A61H 15/0078 601/102
8,360,997 B2 1/2013 Ferrara
11,685,045 B1 * 6/2023 Herzog .................... B25J 9/161 700/250
2007/0282228 A1 * 12/2007 Einav ............... A63B 21/00181 600/300
2008/0242521 A1 * 10/2008 Einav ..................... G16H 20/30 482/110
2017/0266077 A1 9/2017 Mackin
2019/0344444 A1 * 11/2019 Morra .................... B25J 9/1692
2021/0331316 A1 10/2021 Bhat
2022/0134551 A1 5/2022 Litman

* cited by examiner

*Primary Examiner* — Quang D Thanh
(74) *Attorney, Agent, or Firm* — Van Pelt, Yi & James LLP

(57) ABSTRACT

Adjusting of robotic trajectory includes continuously generating a sequence of goals for a robotic arm in accordance with the trajectory. It further includes receiving a command from an input device. It further includes selectively modifying a next goal based at least in part on the command received from the input device. An end effector interacts with a deformable body based at least in part on the modifying of the next goal.

21 Claims, 23 Drawing Sheets

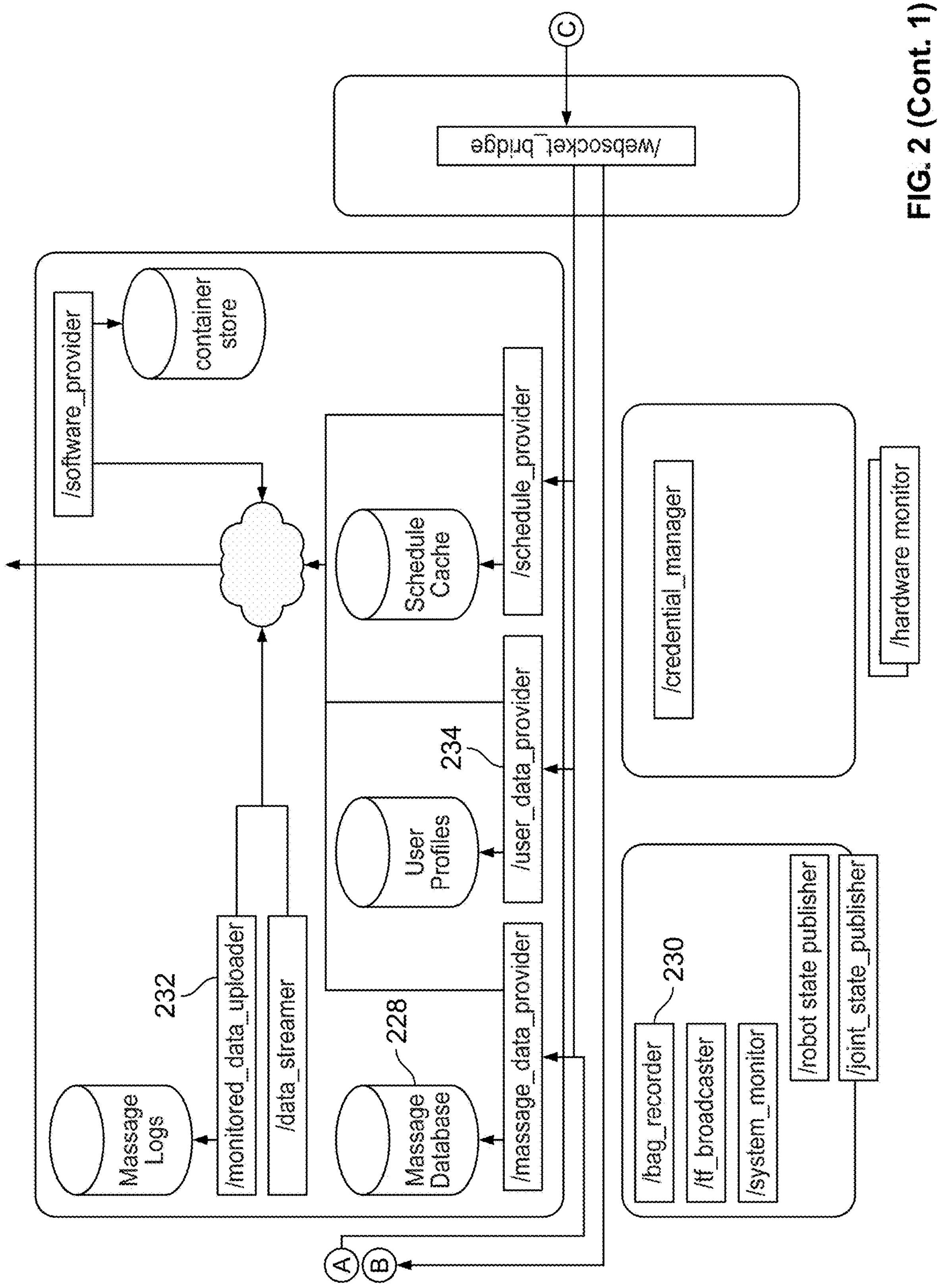
FIG. 2 (Cont. 1)

FIG. 2 (Cont. 2)
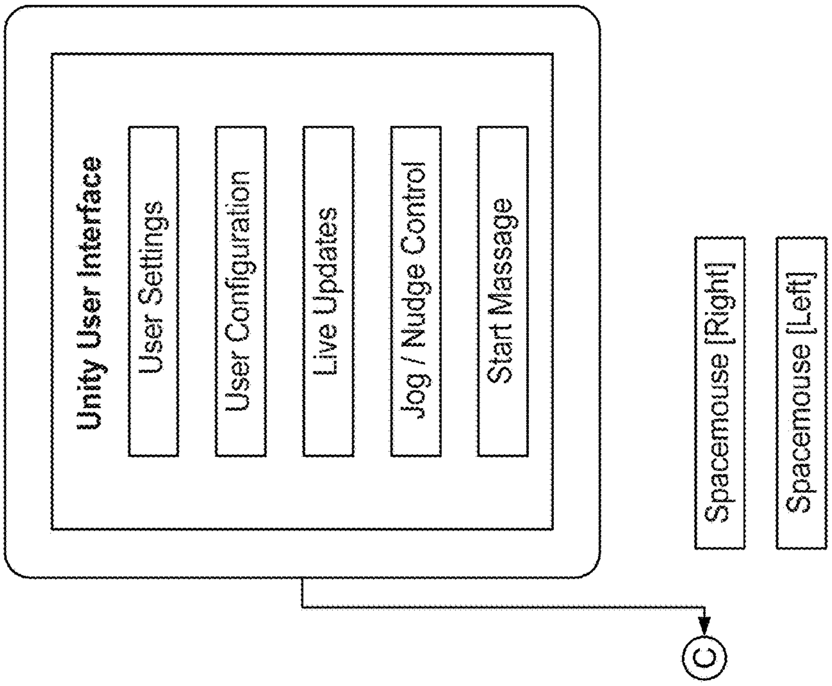

USER ADJUSTMENT OF ROBOTIC MASSAGE

BACKGROUND OF THE INVENTION

In order for a massage to be effective, there should be communication between the massager and the massaged. This can be challenging in the context of a robotic massage. Improved techniques for communication in robotic massage are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following are embodiments of facilitating user adjustment of robotic massage. In some embodiments, the robotic massage system described herein provides an automated stand-in for a human therapist. In the context of massages, even an expert therapist with their palpation ability may not always be massaging in exactly the correct spot. In order for the massage to be effective, two-way communication is needed, where the person being massaged also provides feedback to the entity performing the massage. While with a human masseuse, such two-way communication is easily done, it can be challenging in the context of a robotic massage. Described herein are embodiments of facilitating user-indicated adjustments to a robotic massage. Providing the capability for users to make adjustments not only allows correction of any positioning accuracy, but also reflects that only the user knows whether a massage is being applied to the appropriate location.

Overview of Robotic Massage System

Figure 1:
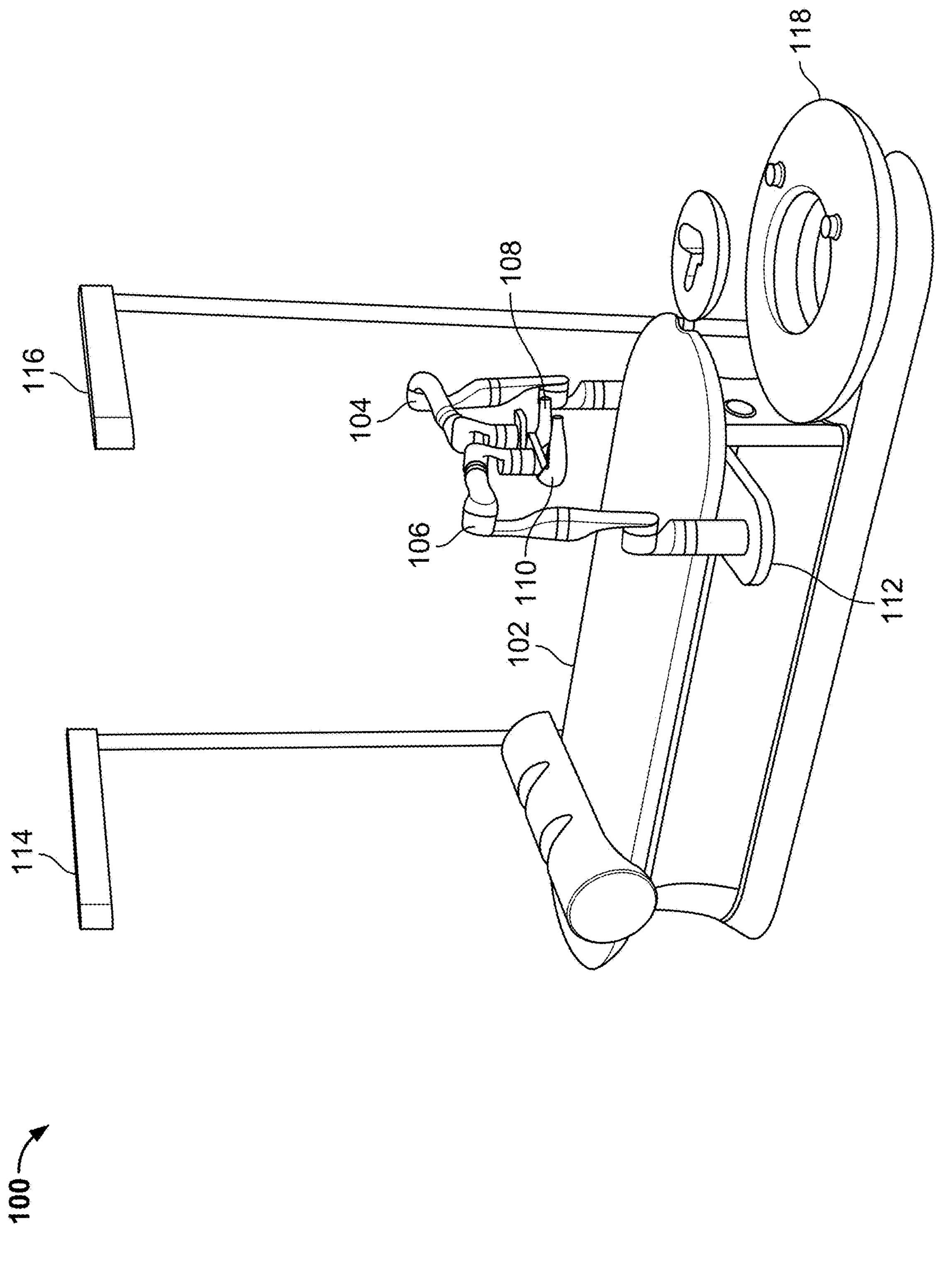
FIG. 1 illustrates an embodiment of a robotic massage system.

FIG. 1 illustrates an embodiment of a robotic massage system. In this example, robotic massage system 100 includes various components. For example, system 100 includes a bed or table 102 that a participant or subject rests on. In this example, system 100 further includes two robotic arms 104 and 106, one on each side of the table. While an example robotic massage system with two robotic arms is shown in this example for illustrative purposes, the robotic massage system may be variously adapted to accommodate any other number of robotic arms, as appropriate. As shown in this example, the arm includes one or more segments or links that are interconnected by a set of joints. In some embodiments, there are one or more controllable motors or actuators at each of the joints, which allows the links to be moved, thereby allowing the robotic arms to be articulated. At the ends of each of the arms 104 and 106 are, respectively, end effectors 108 and 110 (also referred to herein as touchpoints). In some embodiments, the end effector is a removable device that is attached to a wrist of the robotic arm. The end effector makes contact with the deformable body of the person. An end effector may be of various types. In various embodiments, an end effector is a gripper, a roller, a suction cup, a powered tool, a massage tool, etc. In some embodiments, an end effector is shaped for performing a massage technique, such as pinning, rolling, stretching, grabbing, etc.

In this example, the bases of the robotic arms (that are on the ends opposite of the end effectors) are attached to a rail system. For example, the bases of the arms are pivotably attached to plate 112. In this example, plate 112 is connected to a linear rail system embedded within the bed. The rail system is a controllable system that allows the base plate 112 (and thus the arms) to translate linearly along the length of the bed 102. In some embodiments, there is a single plate that both arms are connected to, and both arms move linearly together when the plate is moved along the linear rail. In other embodiments, the arms are independently translatable along the length of the bed/table. For example, each arm is attached or mounted to its own base plate, which in turn is attached to its own individual rail.

The combination of the controllable linear rail system, as well as the controllable motors in the robotic arms described in this example, allows the end effectors to be positioned to reach any part of the subject's body. In this way, the end effector may be positioned to perform a task such as making physical contact with specific points on a subject's body, where the robotic arm and end effector are controlled (e.g., in an automated or computerized manner) to provide a certain pressure at those targeted points on the subject's body.

As will be described in further detail below, the hardware of the robotic massage system, such as the end effectors, robotic arms, and linear rail, are controlled by one or more controllers that send commands (e.g., torque commands) to actuators of the hardware (e.g., the robotic arms). Torque commands are one example type of interface for controlling a robot. Other types of interfaces may be utilized, as appropriate. In some embodiments, the controller is controllable via a computing device such as an embedded tablet and controls 118 (example of an input device for receiving user commands and presenting information) that a user may interact with (e.g., via graphical user interfaces displayed on the tablet, physical controls, voice commands, eye tracking, etc.). Other examples of input devices include, in various embodiments, joysticks, 3D mice, microphones, tablets/touchscreens, buttons, game controllers, handheld remotes, etc. In some embodiments, the hardware is controlled automatically by a networked computer system of the robotic massage system.

In this example, the robotic massage system also includes sensors housed above the table at 114 and 116. In some embodiments, the sensors include vision components situated above the table. In some embodiments, the vision components are utilized by the robotic massage system to generate a view of a subject's body, as well as a characterization of the tissue of the body. Examples of imagery generated by the sensors include depth cameras, thermographic imagery, visible light imagery, infrared imagery, 3D (three dimensional) range sensing, etc. In some embodiments, the overhead structures used to hold the sensors also include lights for lighting the participant's body.

Data Structure Representation of Robotic Massage

The following are embodiments of data structure representations of robotic massages. The massage data representations described herein facilitate automated and computerized control of robotic massages.

In some embodiments, the data representation of a robotic massage is organized hierarchically. The following is an example hierarchical data structure representation of a robotic massage:

Overall Massage: In some embodiments, the root level of the data representation of the robotic massage is the overall massage.

Sections: In some embodiments, an overall massage is further divided or organized into sections. For example, an overall massage may have sections such as a warmup section, or sections that pertain to particular locations of the body or body groupings, such as a mid or upper back section, a shoulders section, etc. In some embodiments, a section provides a macro-level goal, such as a therapeutic goal to improve athletic performance. A sequence of sections in an overall massage may be indicative of the progression of the massage.

Segments: In some embodiments, a section is further made up of a series of segments. Each segment may correspond to a phase of a section, where each phase or segment of the section may have a specific purpose. As one example, suppose a section pertaining to the shoulders and upper back. One segment of such a section may pertain to calibration of user preferences. Another segment may be to work out knots in the shoulders and upper back (given region). Another segment may be to promote stress relief and relaxation for the shoulders and upper back. Another segment may be to increase local circulation. Another segment may be to work out knots in the mid traps. Another segment may be to break up adhesions and scar tissue. Another segment may be to promote stress relief and relaxation for the shoulders and upper back.

Strokes: In some embodiments, a segment is further made up of a group of strokes. In some embodiments, a stroke is performed to provoke a specific body reaction. In some embodiments, a series of those specific body reactions is rolled up into a segment, which has a specific purpose, as described above. That is, in some embodiments, the strokes of a segment are performed to fulfill the purpose of the segment.

One example of a stroke is a singular pass of stripping down the body. The segment may include repeated stripping strokes. In some embodiments, strokes are pre-chosen and performed to provoke a particular therapeutic benefit. One example of a stroke's purpose is to warm up muscles. Another example purpose of a stroke is to perform ischemic compressions to reduce blood flow to an area.

As another example, a series or combination of strokes (e.g., multiple passes of a stroke) of a segment may be created for a specific intent, such as to break up adhesions and scar tissue, which may involve a pattern of multiple techniques of warming up the muscles to break up those adhesions, to restore blood flow and circulation, to clear out metabolites, etc. to provide a therapeutic benefit of a massage.

Robotic Goals: In some embodiments, a stroke is further made up of a series or sequence of robotic goals. As used herein, a "robotic goal" refers to a next position (and pressure) that a robotic arm is to go on the body as part of performing a stroke. That is, in some embodiments, a stroke is performed by playing a sequence of robotic goals. As will be described in further detail below, based on the specified position of the next goal, torque or motor commands are sent to motors and actuators of the end effectors, robotic arms, and/or linear rail in order to position and orient the end effector to a desired next position on the user's body. For example, an individual goal represents the position of one or more of the robotic arms at any given point in time. In some embodiments, each robotic goal is associated with a set of parameters. In various embodiments, parameters of a robotic goal include a position, velocity, amount of force to be provided, etc.

While embodiments of data representations of massages are provided above for illustrative purposes, the massage data may be represented in various ways at various different types of data resolutions.

Architecture for Robotic Massage System

The following are embodiments of an architecture of a robotic massage system. In some embodiments, the architecture corresponds to, or is based in part on, the aforementioned hierarchical data structure representation of robotic massages.

Figure 2:
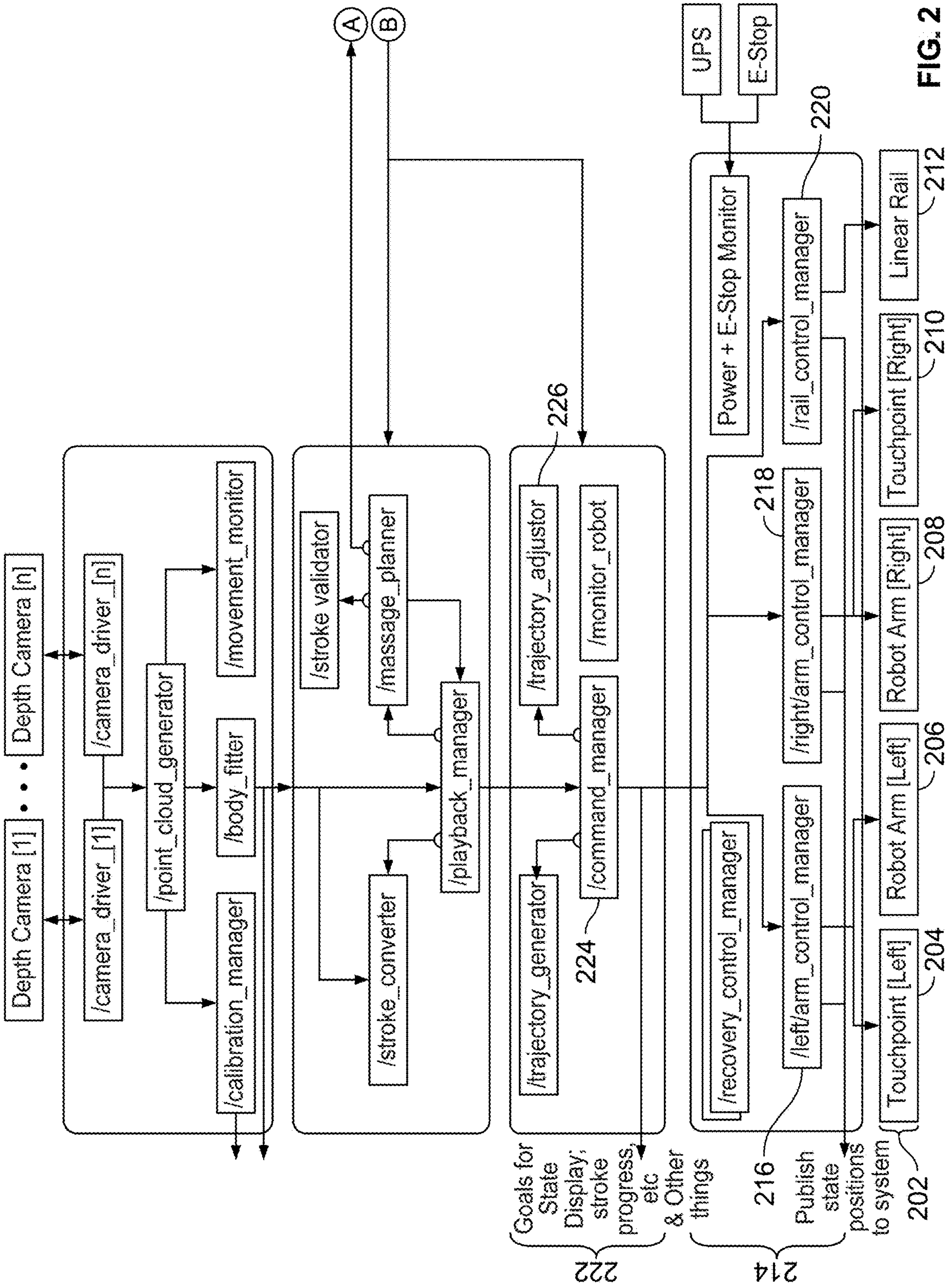
FIG. 2 illustrates an embodiment of a robotic massage system architecture.

FIG. 2 illustrates an embodiment of a robotic massage system architecture. In some embodiments, the robotic massage system of FIG. 1 operates according to the architecture shown in FIG. 2. Other types of architectures may be utilized, as appropriate. In this example, the architecture includes multiple layers or levels.

At 202 is a representation of the physical hardware layer of the robotic massage system. The physical hardware includes the aforementioned hardware components described in conjunction with the robotic hardware of FIG. 1, including left robot arm (206), left touchpoint (204) on the left robot arm, a right robot arm (208), a right end effector (210) (also referred to herein as a "touchpoint") on the right robot arm, and a linear rail 212 for translating the arms along the length of the robotic massage table.

In some embodiments, the hardware layer is a representation of the interface between the software processing of the robotic massage system and the actuation of the physical hardware. In some embodiments, torque controls are communicated to the hardware layer 202 from the next level of the architecture, which in this example is a hardware controller level 214. As shown in this example, at this hardware controller level are control managers that send torque commands (e.g., actuator or motor control commands) to the physical hardware 202. As shown in this example, there are three control managers: a left arm control manager 216 for sending commands to the left arm and left arm touchpoint; a right arm control manager 218 for sending commands to the right arm and right arm touchpoint; and a rail control manager 220 for sending torque commands to the linear rail actuator.

In some embodiments, the control managers are configured to take as input robotic goals, and convert the robotic goals into torque commands that are sent to the corresponding hardware interface at hardware layer 202. This includes, for example, determining position and pressure commands from the robotic goals, and providing corresponding control signals (torque commands) to the appropriate hardware component(s) to cause the hardware to be at the appropriate next location and apply the desired pressure.

In some embodiments, the hardware controller level receives robotic goals from stroke command level 222. As one example, the stroke command level receives as input a stroke, and sends as output a sequence of robotic goals to hardware control layer 214.

The robotic goals may be sent at a variety of frequencies. As one example, the goals are sent to the hardware control level 214 at 30 Hz, or any other frequency as appropriate. For example, suppose a stroke that has 600 goals (e.g., goals numbered from 1 to 600). With goals provided at 30 Hz, this is effectively a 20 second stroke. The command level plays the stroke by "playing" the goals sequentially, which includes sending each goal in the sequence to the hardware control level 214. In some embodiments, a stroke has a trajectory (e.g., along the user's body), where the stroke trajectory is defined by the sequence of robotic goals. In some embodiments, users may make adjustments to the trajectory of a stroke. In some embodiments, this is implemented by adjusting the goals that are provided as output by the command level.

An example of a frequency at which robotic goals were generated was described above. The various levels of the architecture may operate at different frequencies, examples of which are described below. The following examples of frequencies are provided for illustrative purposes, and other frequencies may be utilized. The frequencies may also be adjustable.

As one example, sections of a robotic massage may be determined on the order of several minutes. The segments of a section may be defined at the minute-level granularity. In some embodiments, the strokes of a section operate on the order of seconds. As described above, as one example, robotic goals are generated at a frequency of 30 Hz. As also described above, in some embodiments, the hardware controllers (e.g., managers 216-218) take a robotic goal and convert it into torque commands that are issued to the hardware of the robotic massage system (e.g., the arms, touchpoints, and linear rail). In some embodiments, the managers are configured to send the torque commands at a higher frequency (e.g., 1 kHz) to implement changes in position and applied pressure of robotic goals.

Adjustment of Robotic Massage

As described above, as part of performing a robotic massage, the robotic device and its hardware components (e.g., arms, end effectors, and linear rail) are controlled to perform a variety of massage strokes. To implement a massage stroke, the robotic device is manipulated according to, for example, a trajectory specified for a stroke (e.g., path along subject's body). As described above, based on the parameters of the stroke, such as its trajectory, robotic goals are sequentially played, with the robotic device physically manipulated accordingly (e.g., to follow the trajectory).

Figure 3:
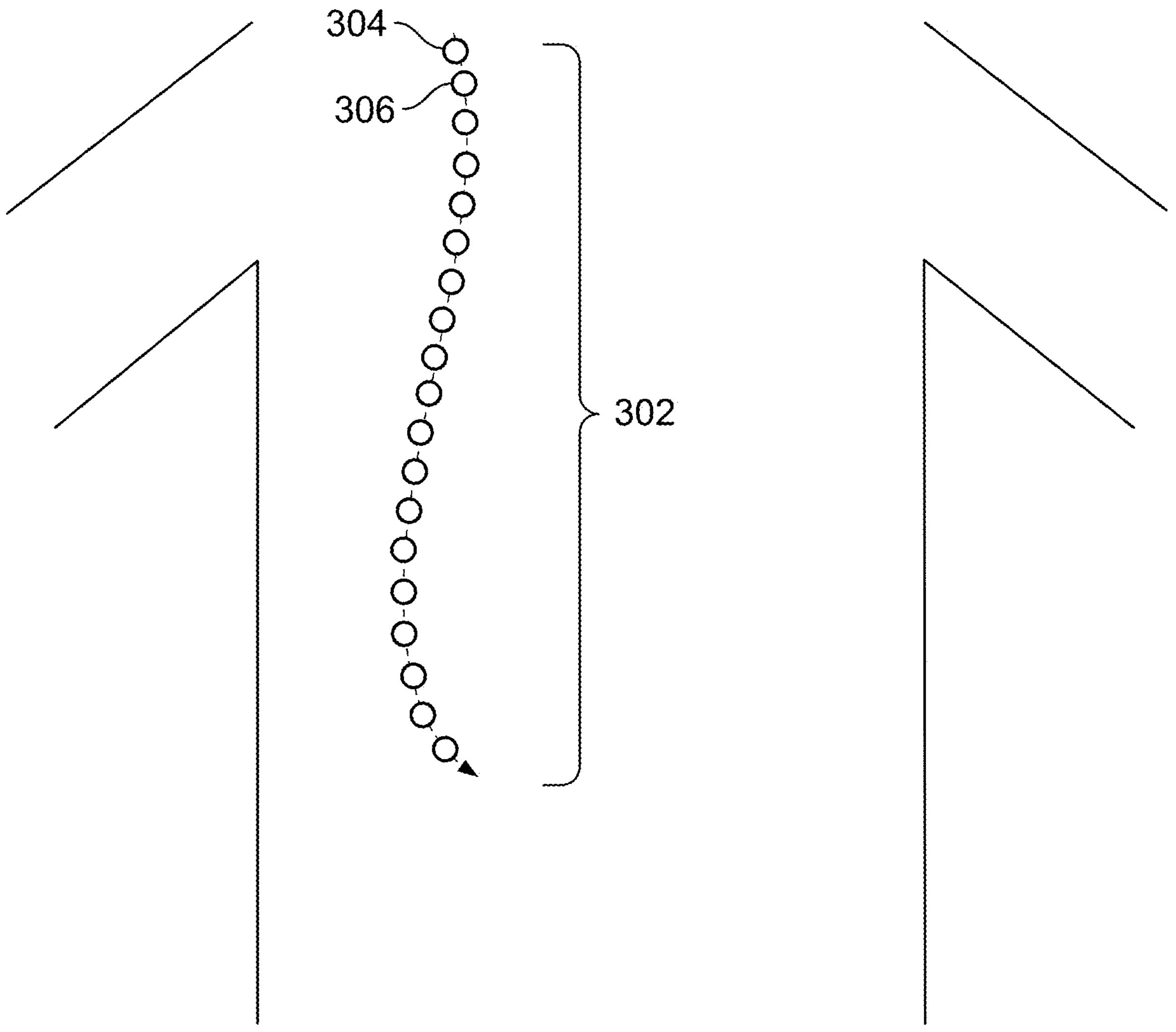
FIG. 3 illustrates an embodiment of a trajectory of a stroke along a subject.

FIG. 3 illustrates an embodiment of a trajectory of a stroke along a subject. In this example, suppose the subject is laying face down (i.e., prone) on the massage table. A portion of the user's upper torso is shown in the example of FIG. 3. An example of a stroke performed by the robotic massage system on one side of the user's back is shown at 302. In this example, for illustrative purposes, a stroke that is performed by a single robotic arm is shown. Other strokes may involve the use of both robotic arms of the robotic massage system, examples of which are described in further detail below.

As shown in this example, the stroke follows a curving trajectory that starts from the user's shoulder and ends at a point on their lower back. As described above, the robotic massage system effects the trajectory of the stroke by controlling the robotic device (e.g., arms, end effectors, linear rail) to move according to a sequence of robotic goals that make up the stroke, for example, starting with robotic goals 304 and 306.

In some embodiments, initially, the stroke that is performed by the massage robotic system is based on a recording of manual manipulation of the robotic arm by, for example, a therapist (who effectively, by the manual manipulation, "teaches" the robotic massage system how to perform a specific stroke). For example, the robotic massage system replays a version of the previously recorded stroke that is adapted for the morphology of the specific subject undergoing treatment (e.g., via retargeting).

In some embodiments, in order to provide the user an understanding of what the robotic massage system is performing, a visualization of what the robotic massage system is doing, as well as contextual information associated with the robotic massage, is provided to the user. For example, information is displayed via embedded tablet 118. In some embodiments, the tablet device is a control panel that includes a touchscreen interface. The control panel may also include physical buttons. In various embodiments, the panel presents various user interfaces to display information to the user, as well as receive input from the user. Other types of devices may be used to present information and obtain input from the user.

Figure 4A:
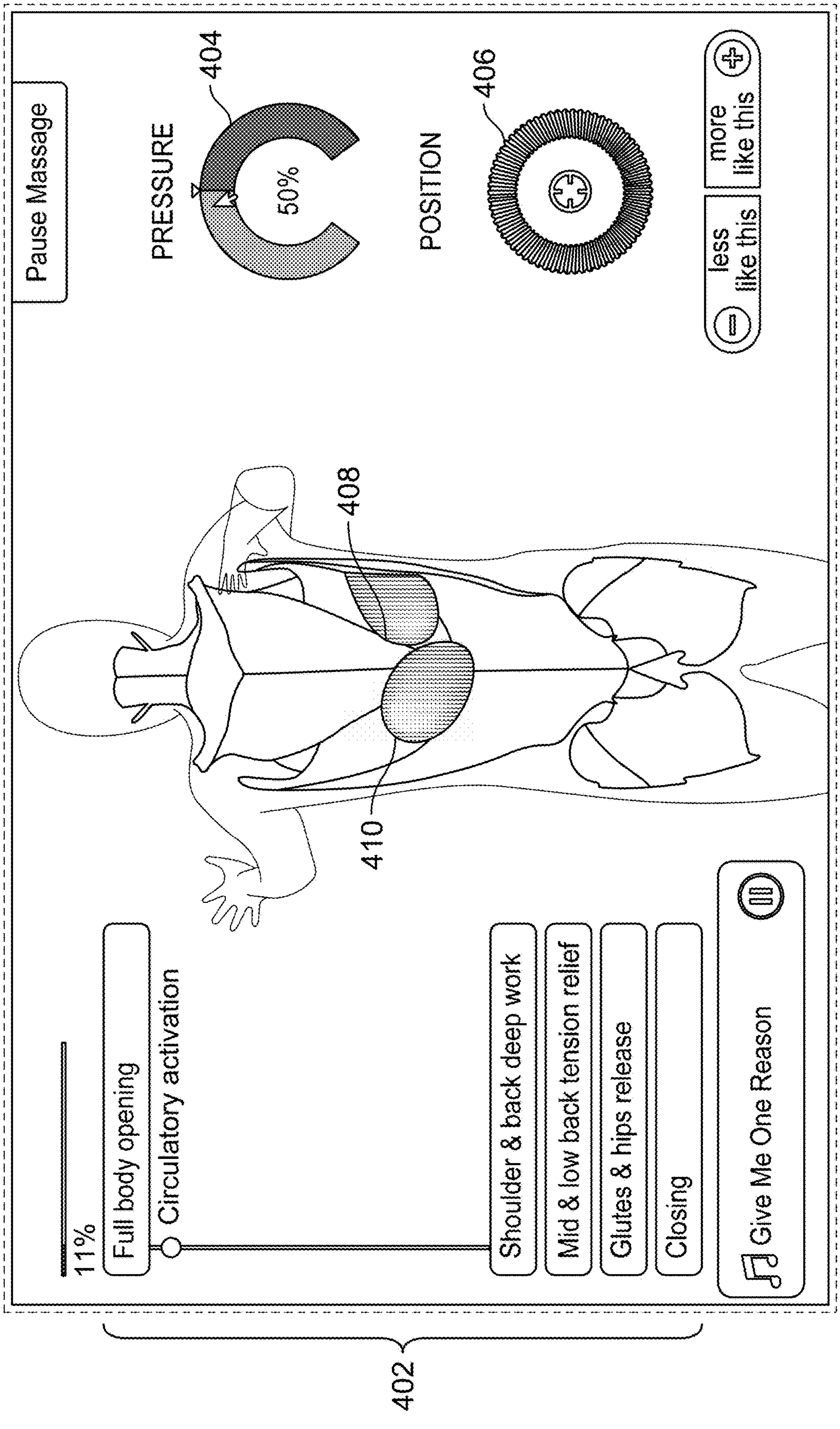
FIG. 4A illustrates an embodiment of a robotic massage user interface.

FIG. 4A illustrates an embodiment of a robotic massage user interface. As shown in this example, via the user interface, complex data related to the robotic massage is visualized together, for example, on a single body model.

For example, via the user interface, the robotic massage system may display information pertaining to the fitting of the user's body, which the robotic massage system uses to determine an understanding of the user's body. In some embodiments, via the user interface, wire frames or images of portions of a user's body are shown. The user may also use the control panel to select, from a set of massages, the particular type of massage they would like to perform, where each massage may have a different therapeutic goal, such as targeting a specific treatment, or as part of a treatment routine or regimen. Via the panel, the user may also select the regions of focus where they would like to spend more or less time on. Other massage preferences may also be configured by the user via the interface, such as setting default pressure or force preferences (e.g., to adjust how firm or light the user would like the massage to be).

As another example of information provided via the user interface, as shown in this example, at 402, the user is also able to view a timeline of the overall massage, including its various sections and segments. Examples of sections in this example include full body opening, shoulder & back deep work, mid & low back tension relief, Glutes & hips release, and closing. Under the full body opening section is an example of a segment within that section, circulatory activation.

In order to maximize the effectiveness of the robotic massage, the robotic massage system not only provides information about the robotic massage to the user, but also provides users the ability to provide feedback to adjust the massage. For example, the robotic massage system is configured with the capability to receive input commands from the user to provide feedback and make adjustments to the robotic massage.

In some embodiments, the robotic massage system is configured to adjust the robotic massage based on the received user input. The following are embodiments of the robotic massage system processing user input commands and adjusting the robotic massage.

For example, referring to the example of FIG. 4A, at 404, the user interface provides an option to adjust the current pressure being applied by the robotic massage system. As shown in this example, the user is able to adjust the pressure between 0% to 100%. At 406, the user interface also provides an option to adjust the position of the end effectors (e.g., "nudge" them from their current trajectory, as will be described in further detail below).

In this example, a visualization of the strokes on a region of the body is shown. For example, the trajectory for a stroke of the segment that the robotic massage system is performing is rendered on the body model. In this example, at 408 and 410 are the positions of the touchpoints or end effectors, which are where the end effectors are making contact with the user's body. In some embodiments, the impact of the touchpoint is perceived in a narrower or wider area, depending on how much of the user's tissue is being displayed.

In some embodiments, the full (or at least partial) trajectory of the touchpoints is displayed. For example, the display is configured to present a representation of where the touchpoint has been, and where it will be going.

Figure 4B:
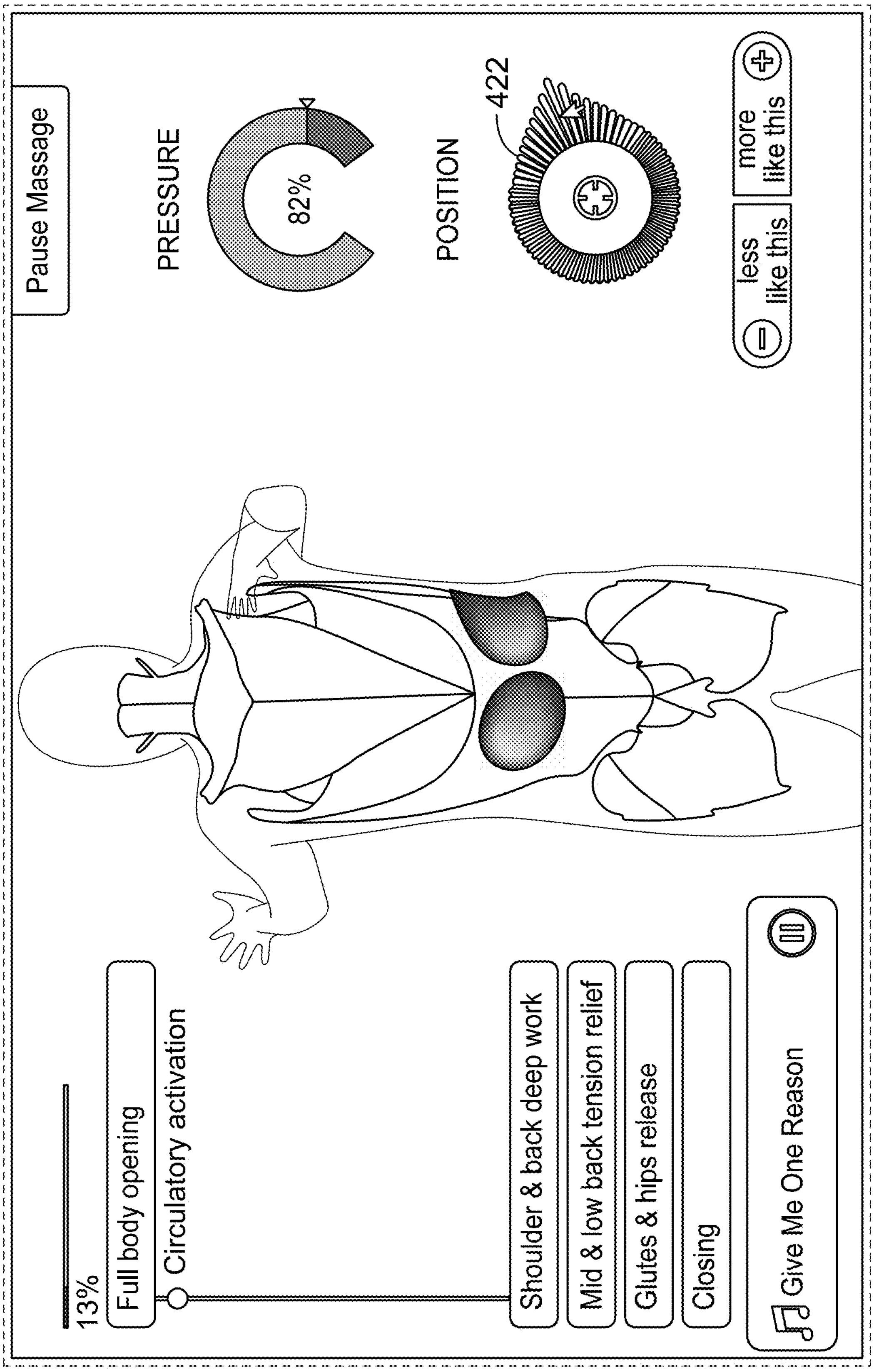
FIG. 4B illustrates an embodiment of a massage adjustment interface.

FIG. 4B illustrates an embodiment of a massage adjustment interface. As shown in this example, at 422, the user has provided a command to adjust the position of one or more of the end effectors. In this example, the user is dragging the cursor to the right and upward. For example, to adjust the position of the end effectors, the user clicks on the position dial and drags the dial in the direction of adjustment. In some embodiments, the visualization of the strokes is updated accordingly. In this example, a top-down view of the user's back is shown, and the user's input is a planar command. The user is provided the option to adjust the position in a two-dimensional (2D) X-Y plane. For example, the user interface allows the user to make a planar adjustment or nudge. In this example, the dial and the request are made relative to the top-down view of the user's back, where dragging the dial up and to the right corresponds to the user requesting that the stroke be moved further up the body (toward the shoulders) and to the right side of their body (from the top-down perspective).

In this example, based on the user's desired position adjustment input, the robotic massage system modifies the trajectory of the linear rail, end effectors, and/or robotic arms involved in the massage. In some embodiments, the adjustment to the position of the robotic arms is not necessarily a direct one-to-one mapping or correspondence to the user's desired or requested input/offset and the manner in which the arm is ultimately moved. For example, the manner in which the hardware is ultimately controlled or instructed to move is based on a variety of checks, such as for safety, user experience, etc. for various reasons such as safety or user comfort, and the robotic massage system applies various filters or limits to the user input to determine the hardware control signals that are sent to the hardware layer. For example, the user's input command indicates a desired X-offset and a desired Y-offset. The system performs interpolation based on the user command to determine a modification (e.g., offset) to a next robotic goal. Various intermediate processing is performed based on the input commands, resulting in modifications to the next robotic goal.

The following are further embodiments of user interfaces for robotic massage. The example interfaces described herein include examples of user stroke adjustment controls. The example interfaces illustrate various ways a user may visualize and adjust the work being performed in relation to their live body model.

Figure 4C:
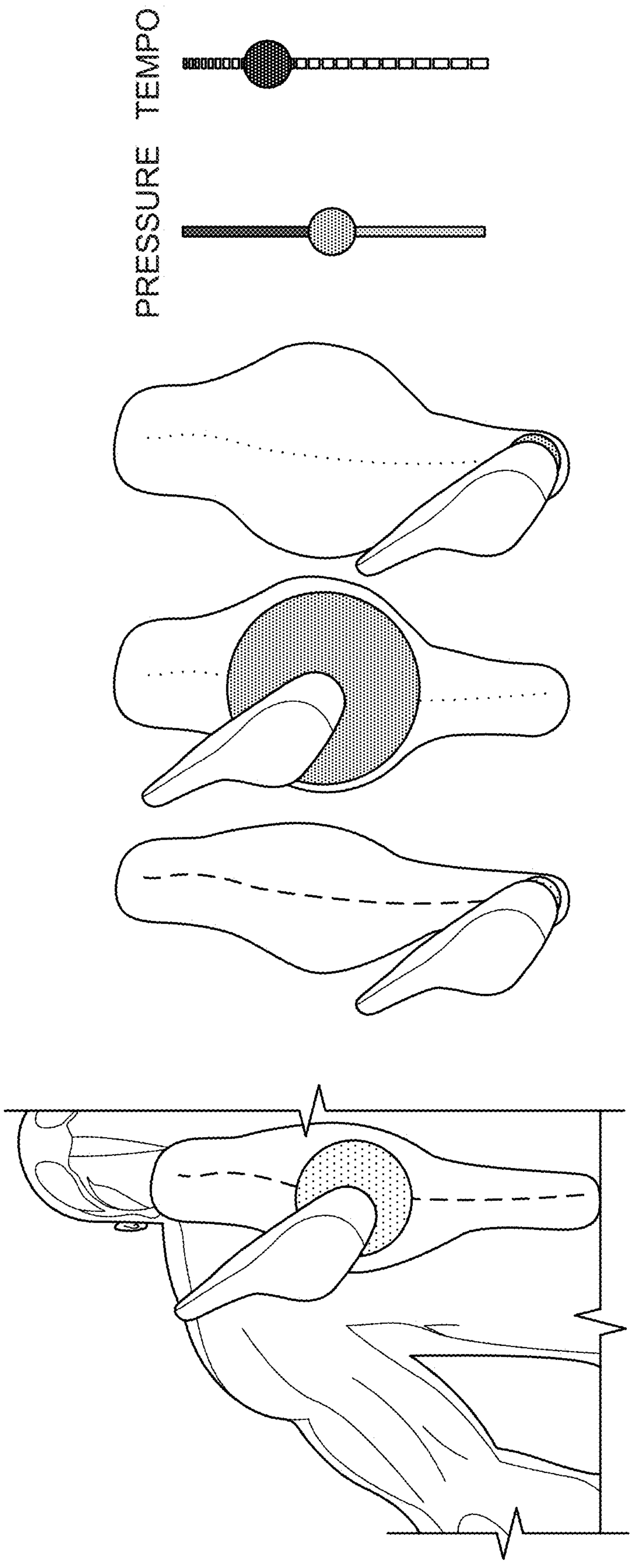
FIG. 4C illustrates an embodiment of a user interface for user stroke adjustment.

FIG. 4C illustrates an embodiment of a user interface for user stroke adjustment. As shown in this example, a body model is shown in a UI system of a robotic massage system. In some embodiments, while the massage is running, the body model is shown in perspective view. Minimal muscle detail is shown in this example. In some embodiments, while stroke position is being adjusted, or in local work, the model or representation of the user's body is shown in flat view, with the muscle/skeleton detail that is needed for intelligent adjustment.

Figure 4D:
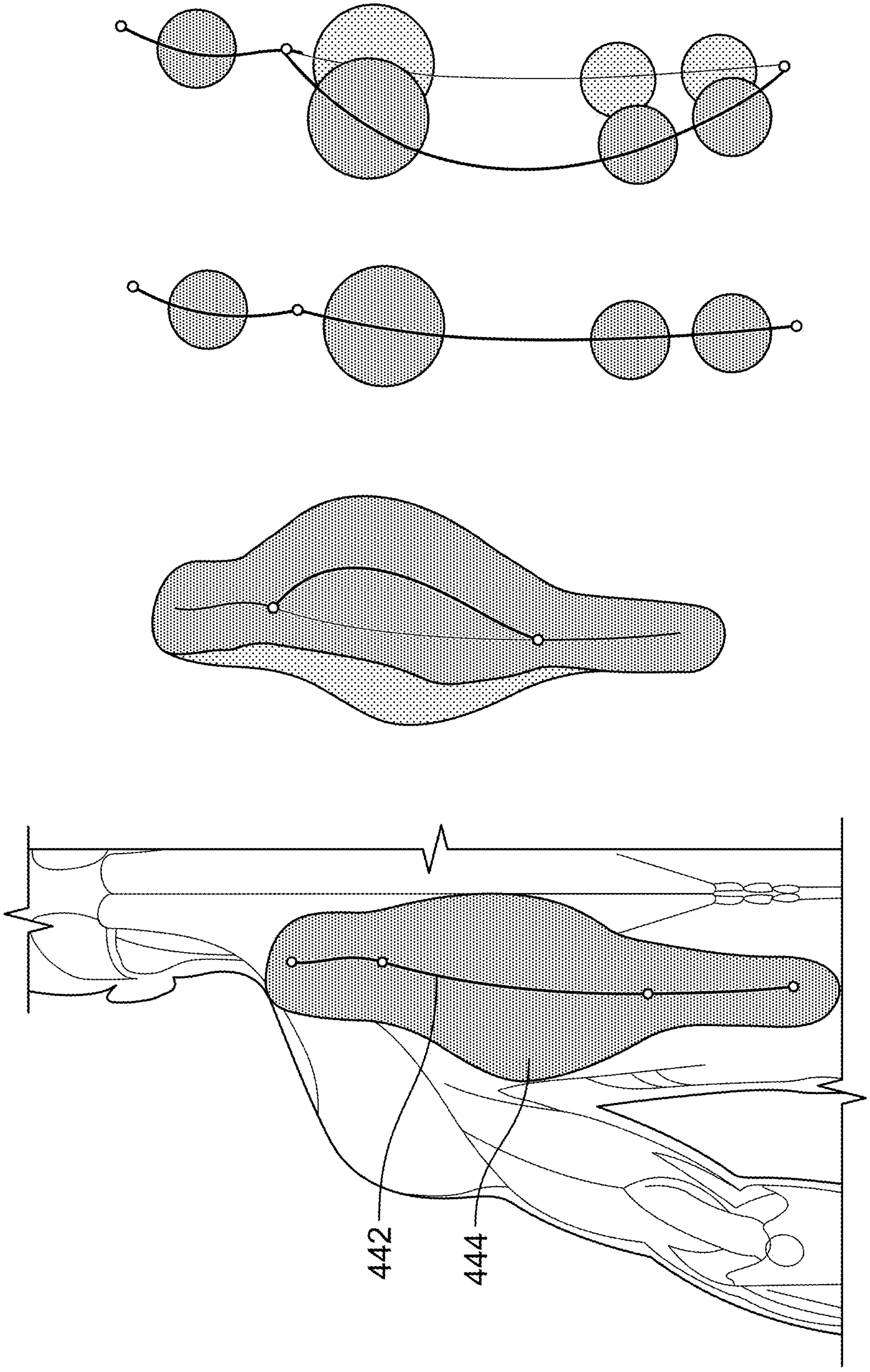
FIG. 4D illustrates an embodiment of a user interface for user stroke adjustment.

FIG. 4D illustrates an embodiment of a user interface for user stroke adjustment. In this example, stroke splines (e.g., spline 442) are shown. In this example, clicking on any part of the targeted region (444) pauses massage, and hides touchpoint/pressure controls. The user, via the user interface, may then drag the splines to adjust intelligent subsegment(s) of the stroke (where anchors defining the subsegments are determined, for example, by muscle/bone landmarks to avoid or to target. Being able to drag the spline in the UI allows the user to warp the trajectory of the stroke.

In other embodiments, the massage does not necessarily pause when using this form of control. The user may also drag the spline while the stroke is being performed and upon release of the spline, the end effectors shift to the adjusted trajectory. In an alternate embodiment, the end effectors continuously follow the user as they adjust the trajectory or the location of that trajectory.

As one example of user adjustment, to adjust the stroke, the user adjusts the spline line to shift the position of a stroke or part of a stroke (where the trajectory may be made up of multiple splines). For example, the user may perform such an adjustment in order for the massage work to better align to a muscle or to avoid any painful areas.

Figure 4E:
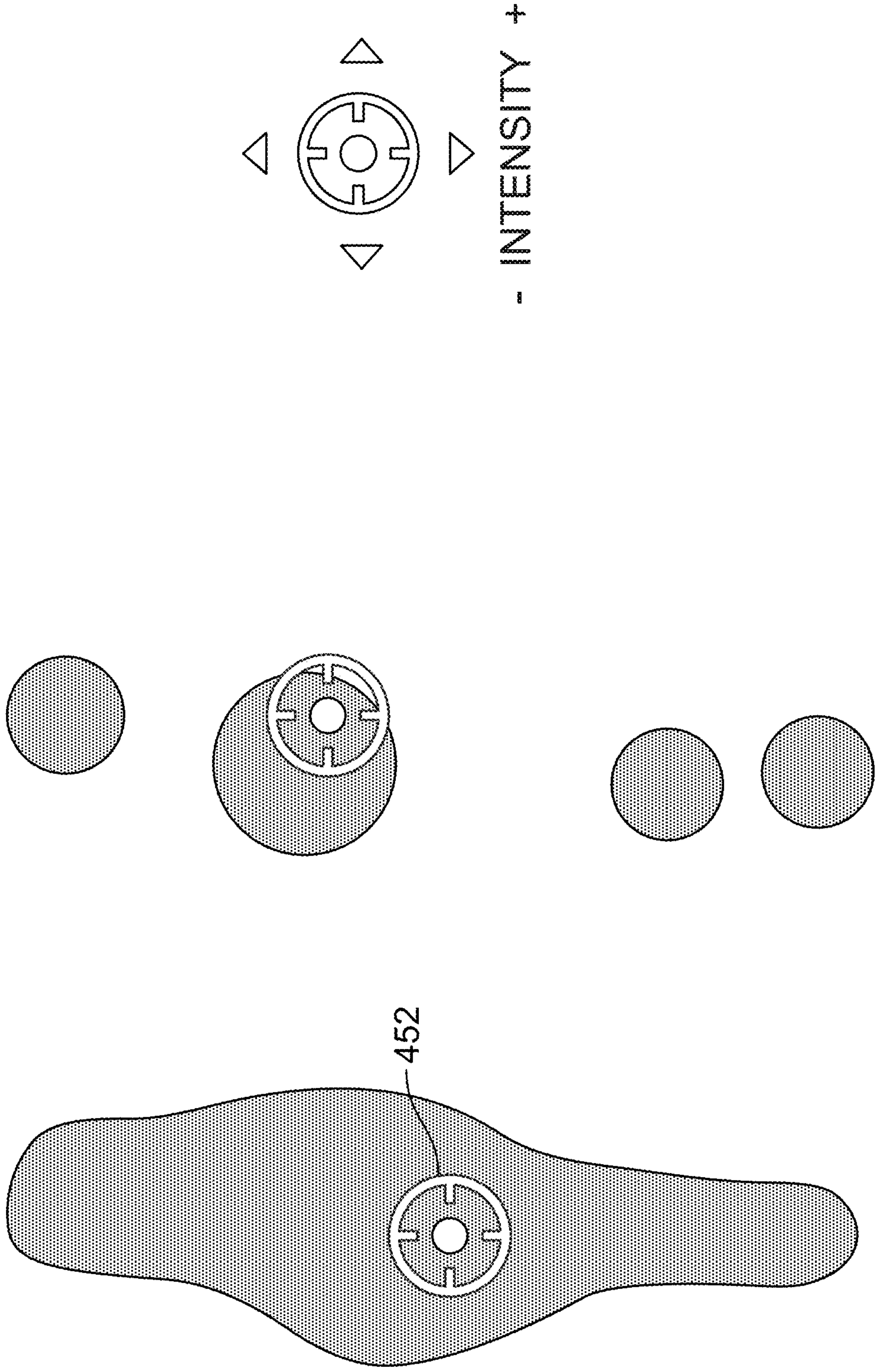
FIG. 4E illustrates an embodiment of a user interface for user stroke adjustment.

FIG. 4E illustrates an embodiment of a user interface for user stroke adjustment. In this example, a static work target is shown. In this example, clicking the current touchpoint position (452) pauses massage, hides touchpoints/pressure/trajectory controls, and allows the user to click anywhere within the impact region to start static deep work, which in some embodiments loops pre-programmed localized strokes at user-controlled intensity (in some embodiments, pressure/tempo controls are made unavailable) that can be adjusted within a safe radius (e.g., using the bounding techniques described in further detail below).

As another example of user adjustment, to adjust the stroke, the user moves the purple target 452. In this way, the robotic massage system is able to identify and hone in on a specific knot/trigger point that requires attention. The following are further embodiments of trigger point identification in automated treatment.

In some embodiments, the robotic massage system performs exploratory strokes to identify potential trigger points. In some embodiments, exploratory strokes are slow, focused strokes that are applied to the patient's musculature in order to reveal to the patient the general locations of muscle tightness, and therefore a potential trigger point. In various embodiments, patients may choose a full-body exploration or may limit the exploratory strokes to body areas where they know they have knots or pain. In some embodiments, the anatomical model used by the robotic massage system described herein recognizes that the location of the perceived pain is often not the source of the pain itself and the exploratory locations reflect the characteristic patterns of referred pain.

In some embodiments, once the patient indicates a potential trigger point, the robotic massage system described herein pauses the exploratory stroke and applies pressure along that specific band of muscle until the exact location of the trigger point is apparent to the patient due to the sharp increase in sensitivity.

In some embodiments, if the exploratory strokes are not successful in revealing a trigger point, the patient can manually make minute adjustments to the position of the explorations, or may choose to resume the exploratory stroke.

While the UI examples above illustrate planar adjustments (e.g., desired X-axis and Y-axis adjustments), the user interfaces may also be configured to provide users the capability to adjust the angle of the touchpoint as well.

As described herein, position adjustment, in combination with other controls, such as pressure, allows a user to replicate the adaptations a therapist would make based on their own palpation feedback and the explicit feedback from their client.

In the above examples, user inputs were provided via a tablet or touchscreen interface. As described above, other types of input devices may also be used to receive user commands. As one example, the input device is a microphone that is configured to receive voice commands for adjusting or nudging stroke trajectories. As one example, the user may provide directional commands that include direction as well as an amount of an adjustment, such as "a little to the right," "a little to the left," "a little up," and/or a "a little down." In this example, the allowed directions that can be provided via voice command correspond to the 2D planar offsets that the user can provide via the touchscreen interface. Based on the received user input, the system is configured to map the user input to a degree of a positional adjustment. The degree or amount of adjustment may also be inferred based on the severity or a person's voice. In this example, the system is configured to infer an amount or ratio of displacement relative to the user's verbal or vocal command.

The embodiments of user adjustment of robotic massage described herein allow a user or patient to make continuous adjustments to the work being performed (where it would be unlikely for a patient to continuously course correct a human therapist). Embodiments of the techniques described herein allow a user to stay in work that feels good or move on from work that does not. Further, embodiments of the techniques described herein allow a user or participant or subject to make continuous or minute changes to pressure.

Adjusting Stroke Trajectory by Modifying Robotic Goals

In some embodiments, the robotic massage system implements the user's requested or commanded position adjustment by adjusting the robotic goals of the stroke being performed. For example, while the stroke may have a sequence of original or initial or preconfigured robotic goals, in response to a user request for adjustment, the subsequent robotic goals are adjusted from their original position based on the user's desired offset. This in turn causes the trajectory of the stroke to change based on the user's feedback. As one example, the user's requested adjustment is converted into a position offset. A new robotic goal is generated based on the position offset.

In some embodiments, the hardware adjustments are made dynamically, in real time, as a user requests adjustments via the user input. For example, the latest requested offset values from the user are obtained, and the next goals to be played are updated or modified accordingly. For example, the state positions of the next robotic goals are updated from their original or previous values in real time. This is in contrast to a user making adjustments in advance, which may not feel as responsive.

Some strokes may be configured to be eligible for adjustment, while others are not. In some embodiments, each individual stroke is associated with a flag. In some embodiments, the flag at the stroke level indicates whether the stroke can be adjusted or nudged. For example, some strokes may be prohibited from being adjusted by a user. This type of limiting may be used to ensure that any adjustments are made in a safe manner, and only for approved content. In some embodiments, the user interface is configured to provide an indication of whether or not a stroke is adjustable.

In some embodiments, when performing a robotic massage, a stroke is obtained from a library, while in other embodiments it is generated based on the person receiving the massage. In some embodiments, based on the context of the particular massage being performed, metadata is attached to the stroke. Examples of contextual metadata include:

- region
- lighting
- touchpoint temperature
- content objective (warmup, focused work, cool down, remove knot in this specific trigger point, etc.)
- speed/tempo
- level of intensity or force
- body type (user cluster)
- if it can be nudged or adjusted
- touchpoint tool/area being used In some embodiments, the metadata includes guidance to inform users of information such as whether the stroke is adjustable. Another example of metadata information determined for a stroke to be performed includes pressure parameters, which include, for example, minimum and maximum pressures. The stroke may also include labels indicating a type of category for the stroke, such as how the stroke should feel. This stroke may be used to determine how pressure adjustments are controlled. For example, even if the user indicates maximum pressure on the UI, based on the type of stroke being performed (e.g., indicating that the stroke should feel intense without being painful, or should feel light and gentle), the actual adjustment can be modulated (and not simply directly implementing what the user has requested). In some embodiments, the UI is dynamically adjusted based on stroke metadata.

Suppose that the stroke shown in the example of FIG. 3 is adjustable. Suppose also that the subject of the massage has requested to adjust or nudge the trajectory of the stroke, such as by requesting a position offset such as that shown at 422 of FIG. 4B.

As described above, a stroke is defined by a series or sequence of goals. In some embodiments, a goal's state is defined in part by a position. The series of robotic goals thus, in effect, defines a trajectory of a robot arm in performing the stroke. When a user makes an adjustment, the robotic massage system implements the user command by modifying the positions of the subsequent robotic goals, which, when sent to the hardware, causes the trajectory of the arm to be adjusted, requesting it to deviate from the originally predefined trajectory of the stroke.

Figure 5:
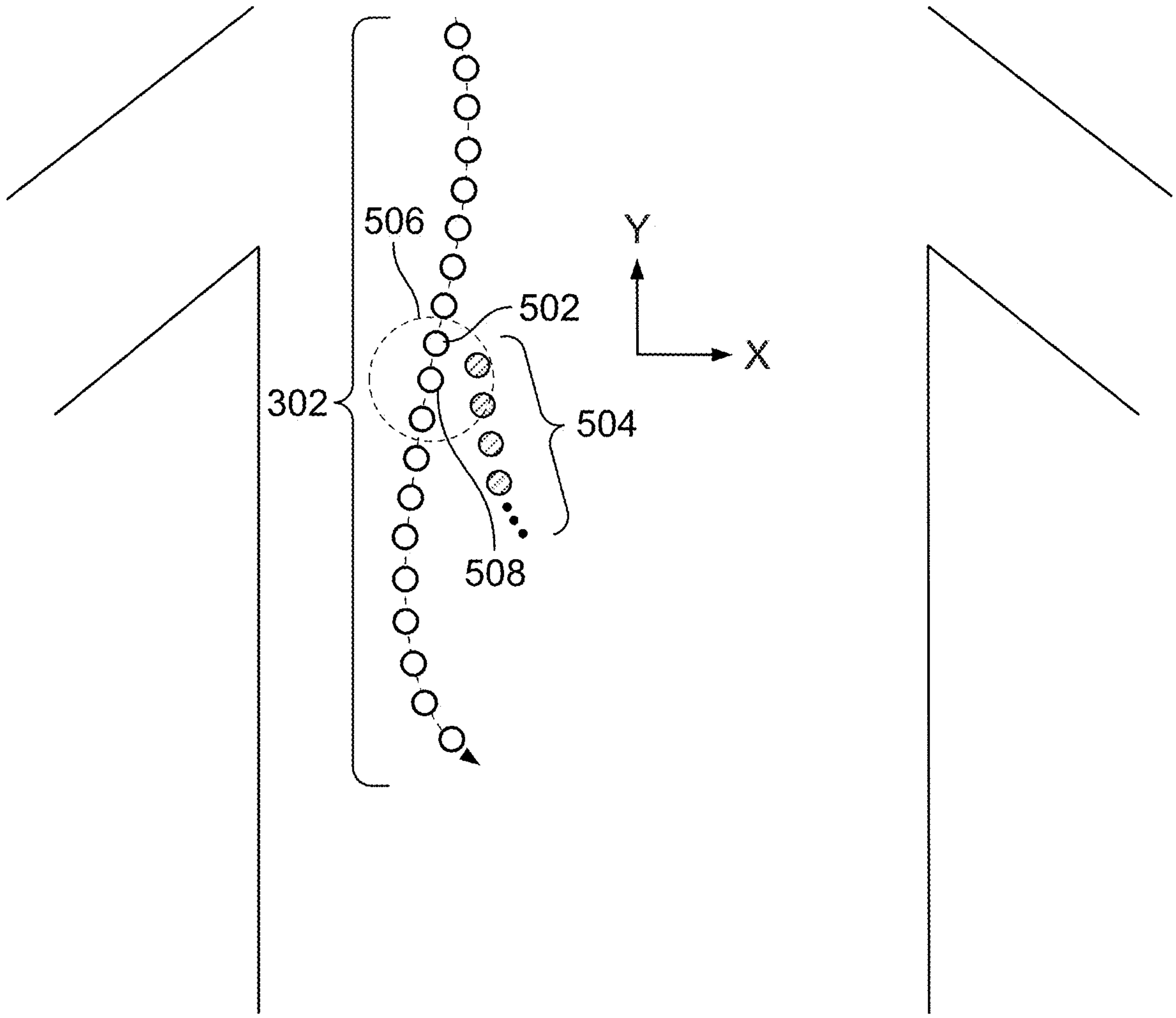
FIG. 5 illustrates an embodiment of a massage stroke trajectory.

FIG. 5 illustrates an embodiment of a massage stroke trajectory. Shown at 302 is a sequence of goals for the unmodified, original stroke shown in the example of FIG. 3. As shown in this example, the robotic massage system "plays" the stroke by processing each robotic goal in the sequence, and commanding the robotic hardware to move from one robotic goal to the next robotic goal in the sequence (e.g., by sending each robotic goal to the hardware control layer).

In this example, the user indicates (e.g., via the user interface of FIG. 4B, as described above) that they would like to adjust or nudge the robot arm while mid-stroke. The desired adjustments are implemented by converting the user requested planar offset into a modification (e.g., offset) of the state position of subsequent robotic goals, and applying the robotic goal offset to the subsequent set of goals remaining in the stroke, causing the trajectory of the remainder of the stroke to be modified.

In this example, suppose that the user makes the requested adjustment input mid-stroke, at a time corresponding to playback of robotic goal (502) of the original trajectory. In this example, via the user interface of FIG. 4B, the user indicates that they would like to adjust their stroke upwards and to the right, which relative to the top-down perspective view of their body, corresponds to nudging the robotic arm to move in the direction more towards their head and to the right side of their body. As shown in this example, the user is permitted to adjust the position of the stroke in a two-dimensional plane. UI adjustment of a massage stroke may be permitted in other spaces or coordinate frames, as will be described in further detail below.

In some embodiments, the position of the next robotic goal is determined based on the received user input of the requested or commanded adjustment. As one example, a set of offset factors is applied to adjust from an original goal to a modified goal. For example, the received user input is determined as offset factors that include a desired X offset and a desired Y offset from the most recently played robotic goal. These user-desired or indicated offset factors are then applied to generate a new position of the next robotic goal (e.g., by adding the offsets to the original position of the next goal in the original trajectory). The modified robotic goal is then translated into a torque or motor command to the hardware, as described above. In this example, the user's requested offset, which is provided as input via a 2D user interface element, is translated into an offset that is also in two dimensions (X-axis offset and Y-axis offset) and is in the Cartesian coordinate frame. As will be described in further detail below, the offsets may be implemented in other types of coordinate frames. Multiple coordinate frames may also be utilized and switched between as part of the adjustment processing pipeline (that includes various types of processing from the input of receiving a user input offset, through to the output of sending torque commands to the robotic hardware). Modifications to other dimensions or positions of robotic goals may also be interpolated, as will be described in further detail below.

In this example, the user had not made any adjustments until after goal 502 had been played by the robotic massage system. At the point of goal 502, the state of X and Y offset values had been zero. As the user indicates that they would like to adjust the position of the robot, the X and Y offset values are increased, which causes the robot arm to move away from the originally programmed trajectory 302.

As part of playing a next robotic goal, the position of the next robotic goal (which would have been 508 if unmodified) is determined based on the current value of the X and Y offset. For example, the X and Y axis offsets are added to the original position specified for goal 508 in the original stroke. As the position of the next goal is determined based on the offset, the next goal will be different from the original goal, resulting in a new stroke trajectory (e.g., defined by the sequence of adjusted robotic goals 504) that deviates from the original trajectory. That is, the robotic goals that are sent to the hardware control layer (of the architecture described above) are the adjusted robotic goals (based on the desired user adjustment), and not the robotic goals of the original trajectory.

As described above, the user may adjust the trajectory of the stroke as the robotic goals of the track are being sequentially played (e.g., sent from hardware control layer 214 to hardware layer 202). The X-axis and Y-axis offset factors are influenced by the user's manipulation of the adjustment element (e.g., target symbol dial 422 of FIG. 4B). In the example interface of FIG. 4B, the user may hold down the position adjustment dial to nudge the arms as the robot arms move. In some embodiments, the state of the X and Y offset factors are kept track of, and are incremented or decremented according to the user's input. For example, if the adjustment is made at the previous goal, the next one will have a similar X and Y offset. The X and Y offsets cause the robot arms to move from the original trajectory to a new adjusted trajectory. For example, as described above, the robotic massage system, instead of being at an original position, adjusts to a desired position. As the new goals are offset from the original trajectory, this results in a new trajectory with an adjusted sequence of goals 504 that is offset from the original trajectory 302.

In some embodiments, as the user holds down and drags the dial, offset values are continually published to increase the X and Y offsets. For example, the offset values are published to the trajectory adjustor, which for example is a command layer responsible for sequentially playing the robot goals that are part of the stroke trajectory. In some embodiments, the command manager requests for the trajectory adjustor to alter each goal in accordance with the user inputs and safety constraints. These incrementations continue to be published as long as the user is holding down the adjustment element to increase the desired offsets.

The aforementioned adjustment to a stroke's trajectory may be introduced in a variety of ways. In some embodiments, such as the example of FIG. 5 described above, the robotic massage system continues to play the stroke while the user is making an adjustment. In other embodiments, goals are interjected. For example, the current stroke is stopped or slowed. The hardware is moved over, and then the robotic massage system resumes the stroke. Examples of such interjection or interpolation of robotic goals are described in further detail below.

As described above, the modifications to robotic goals may be based not only on the user command received via the input device, but also on a variety of other factors, such as for safety, comfort, etc. Further embodiments of stroke adjustments are described below.

Adjustment Saturation

In some embodiments, for an individual goal, the maximum allowed amount of position adjustment is bounded. For example, the amount of permitted offset may be within a radius of the goal, such as within radius 506 of goal 508. Other boundary definitions may be utilized, as appropriate.

In some embodiments, a point of saturation for the offsets is implemented, where values of the desired offset are published until the point of saturation is reached, at which point, the offset values are no longer increased beyond the saturation point. For example, the saturation points are implemented as a maximum allowed value for the X offset, and a maximum allowed value for the Y offset.

In some embodiments, the adjustment to a next robotic goal is based on the configuration of barriers or keep-out zones. For example, if the requested user adjustment is within the allowed bounds, but would overlap with a keep out zone, then the new goal is adjusted to not go into or past the keep out zone or control barrier. The barriers may be of various shapes, such as circles, rectangles, irregular shapes, etc. In some embodiments, the barriers are implemented at the controller level.

Adjustment of Strokes involving Multiple Robotic Arms

Some strokes involve the use of both robotic arms. For example, implementing a massage stroke may involve each of the arms operating along different sides of the body (e.g., about the spine). The following are embodiments of implementing user requested adjustments to strokes involving multiple arms. For example, in some cases, a stroke is adjustable on one arm, but not the other (e.g., adjustable on the left arm but not on the right arm, or vice versa). This is an example of an asymmetric type of adjustment, where only one arm is allowed to be adjusted. Other examples of multi-arm strokes are coordinated strokes (e.g., where the two arms follow each other), as well as mirrored strokes (e.g., where the two arms are being used to implement strokes that have trajectories that mirror each other).

In some embodiments, in order to protect against collisions between the two arms when making adjustments, constraints or limits on the allowable amount of offset or implemented. For example, the positions of the end effectors are determined, and the allowed amount of offset (applied to one or more both of the arms) is constrained such that the end effectors are prevented from being less than a threshold amount of distance from each other.

In some embodiments, the metadata for a stroke includes which arm (or whether both arms) can be adjusted. This metadata is applicable to the overall stroke or to subsets or the stroke.

Embodiments of adjustment of multi-arm strokes are described below. As described above, examples of multi-arm adjustments include coordinated adjustments, mirrored adjustments, and asymmetric adjustments. Adjustment of some strokes may potentially involve all three types of adjustments.

Coordinated Adjustment

The following are embodiments of adjusting a coordinated stroke.

Figure 6A:
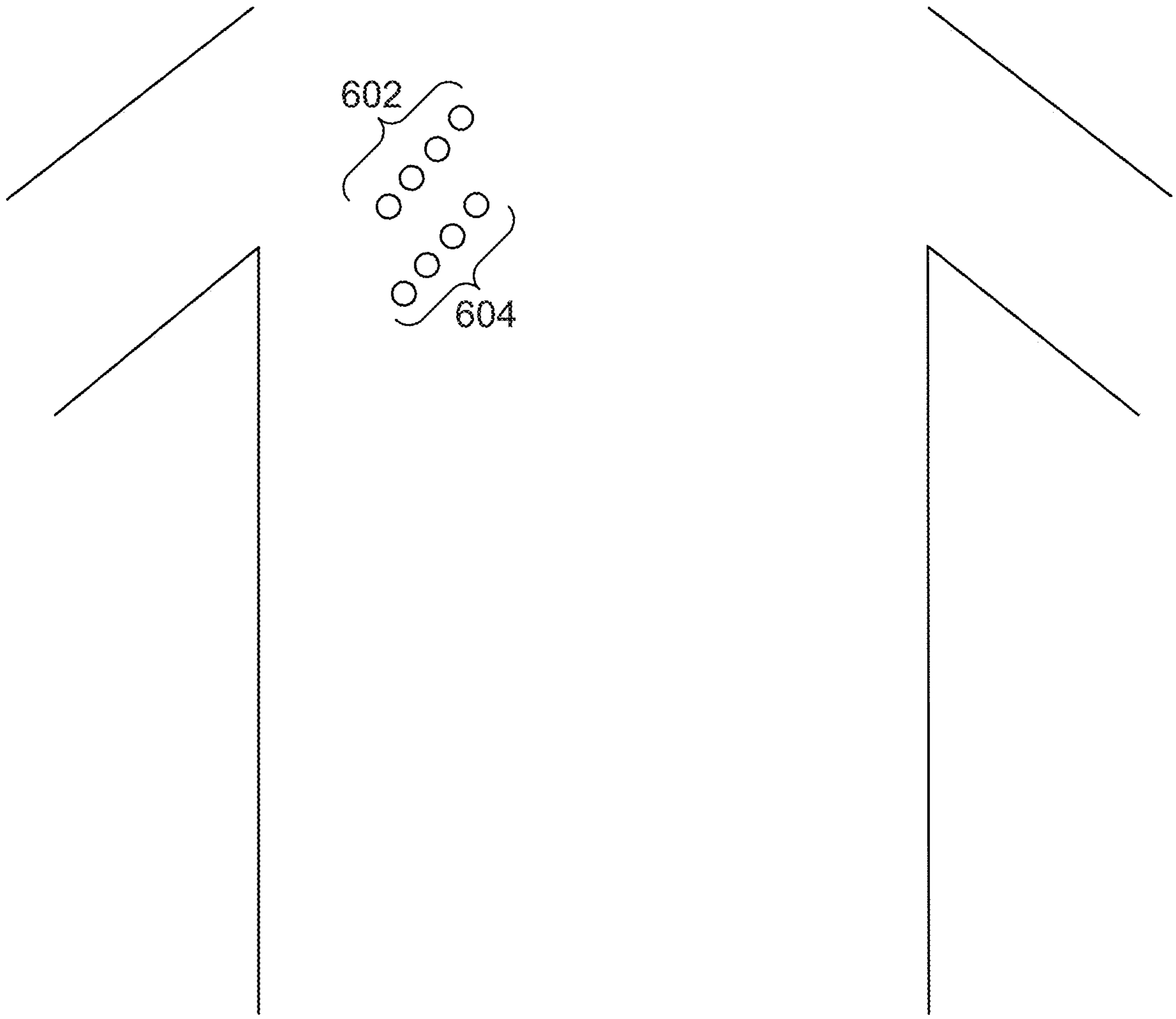
FIG. 6A illustrates an embodiment of a coordinated stroke.

FIG. 6A illustrates an embodiment of a coordinated stroke. In this example, the trajectories of the two arms are programmed so that the arms follow each other in a coordinated manner (e.g., "following the leader"), where one arm with trajectory 602 follows the other arm that has a trajectory 604. In this example, when the user indicates that they would like to adjust the position of the stroke, both of the arms are adjusted, in a Cartesian space for example, in the same way, where the adjustments of the two arms follow each other. For example, suppose that the user provides a user input that indicates a desired X offset and Y offset. A robotic goal offset is determined. The same robotic goal offset is applied to the robotic goals of both arms.

Mirrored/Symmetric Adjustment

The following are embodiments of adjusting a symmetric stroke.

Figure 6B:
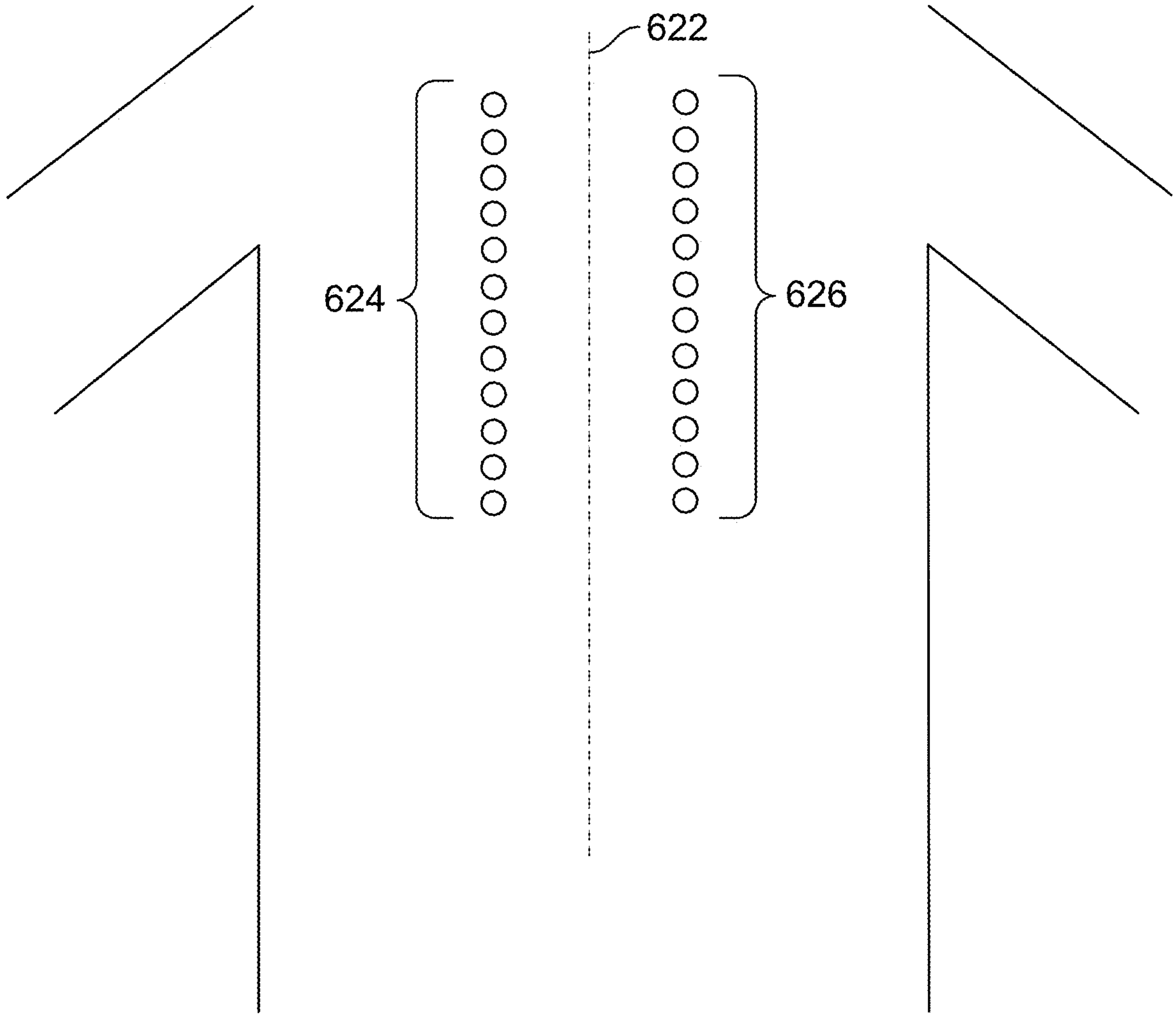
FIG. 6B illustrates an embodiment of a symmetric stroke.

FIG. 6B illustrates an embodiment of a symmetric stroke. One example of a symmetric stroke that is mirrored is stripping down the erectors on both sides of a person's body, which is a deformable entity. In this example, the stroke is performed across the spine 622, and involves the use of both arms. In this example, the spine is an example of a plane that the robotic massage system mirrors around to implement user-guided adjustment of a robotic massage stroke.

In this example, each arm has a trajectory as part of the stroke. For example, the left robotic arm has a trajectory 624. The right robotic arm has a trajectory 626 that is a mirror of the trajectory 624. In this example, suppose that the user would like to make an adjustment to the stroke to move it further out. For example, the user would like the end effectors/touchpoints to be wider or further out. In this example, both end effectors are to be both adjusted in the same, but mirrored manner (same magnitude offset, but in opposite directions). In this example, the user does not need to, via a UI such as that shown in FIG. 4B, separately adjust both arms. For example, based on an indication of a desired position offset, a single pair of X-axis offset and Y-axis offset is determined. One arm is moved according to the X and Y offset. For the other arm, the adjustment is mirrored by reversing the X and Y offset (e.g., by flipping their sign). This will cause the arms to be moved in a mirrored manner. As shown in this example, such adjustability is beneficial for strokes such as stripping down the erectors, where if the user finds the current trajectories of the arms to be too far out or too close in (e.g., because their erectors are slightly out or in relative to where the arms are), the user, via the user interface, is able to move both of the arms out or in, as desired. In some embodiments, the control user interface is configured to support individual adjustment of each arm.

Asymmetric Adjustment

The following are embodiments of adjusting an asymmetric stroke.

Figure 6C:
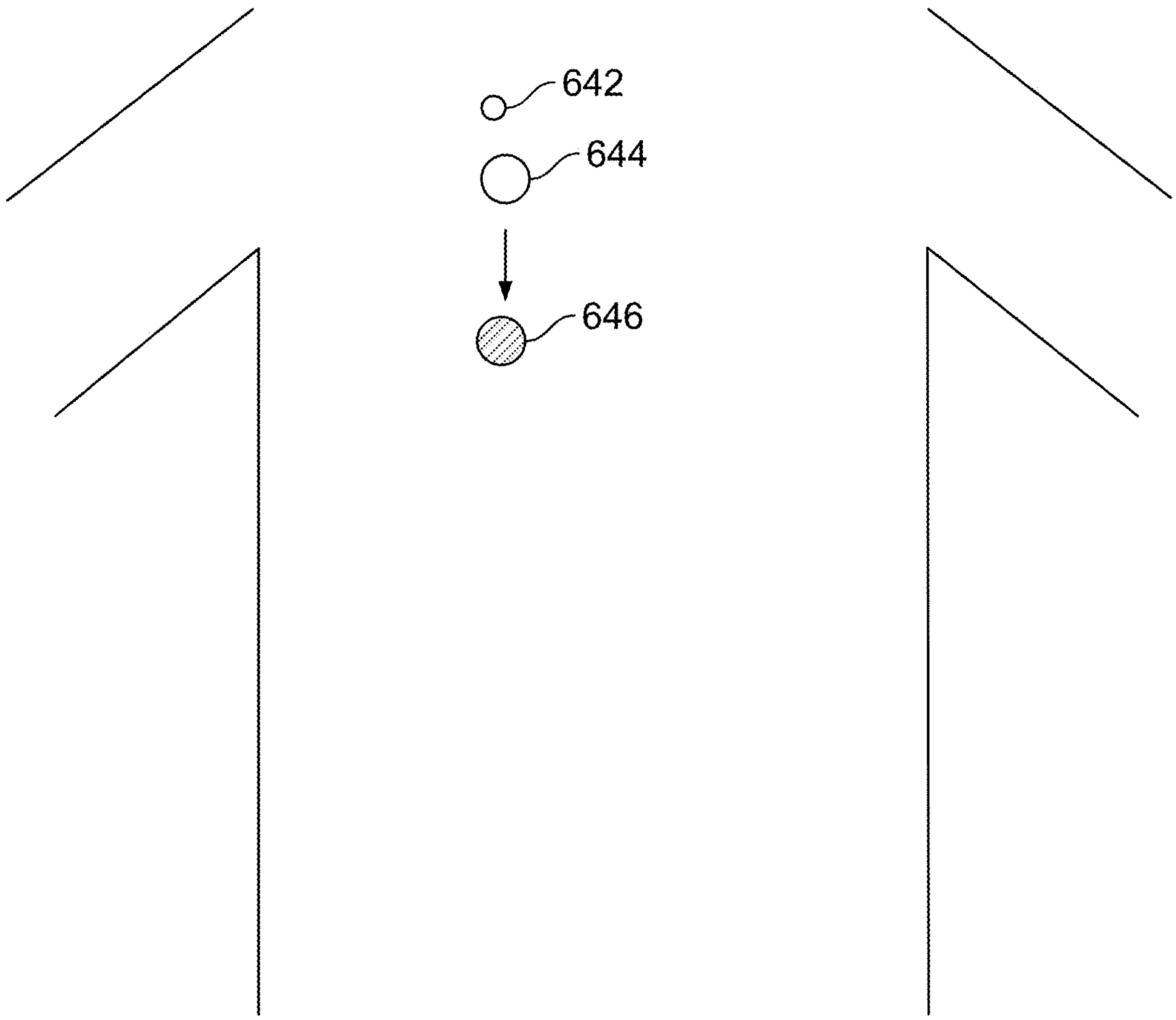
FIG. 6C illustrates an embodiment of an asymmetric stroke.

FIG. 6C illustrates an embodiment of an asymmetric stroke. One example of an asymmetric stroke is a stroke that has a mother hand as support. In this example, the mother hand is implemented by one of the end effectors on one of the arms (e.g., at position 642). The other end effector on the other arm is manipulated to perform a circular motion (e.g., for the purposes of performing deep friction work at the desired position 644). The following is an example of performing an adjustment of an asymmetric stroke. Suppose that the user indicates that they would like to move the end effector that is performing the circular motion downward to location 646. When the subject uses the UI to indicate a desired offset for this stroke, the determined offset is applied only to the robotic goals used to control the robotic arm performing the circular motion (at 644), and not to the robotic arm implementing the mother hand.

Maintaining Continuity when Transitioning to a Next Stroke

In the above examples, adjustment of a trajectory of a stroke was described. A massage segment may be made up of multiple strokes. Thus, as part of progressing through the segment, the robotic hardware may be controlled to move from performing one stroke to another stroke. The following are embodiments of transitioning between a previous stroke and a next stroke, where the previous stroke had been adjusted based on user input. While the previous stroke may have been adjustable, the next stroke may not be adjustable. Thus, there may be issues with discontinuities, as offsets applied to the previous stroke may result in the end position of the previous stroke being a large distance away from the starting position of the next stroke. In some embodiments, the transition between strokes is implemented based on the characteristics of the previous stroke and the next stroke.

Transitioning to a Next Stroke that is Adjustable

Figure 7A:
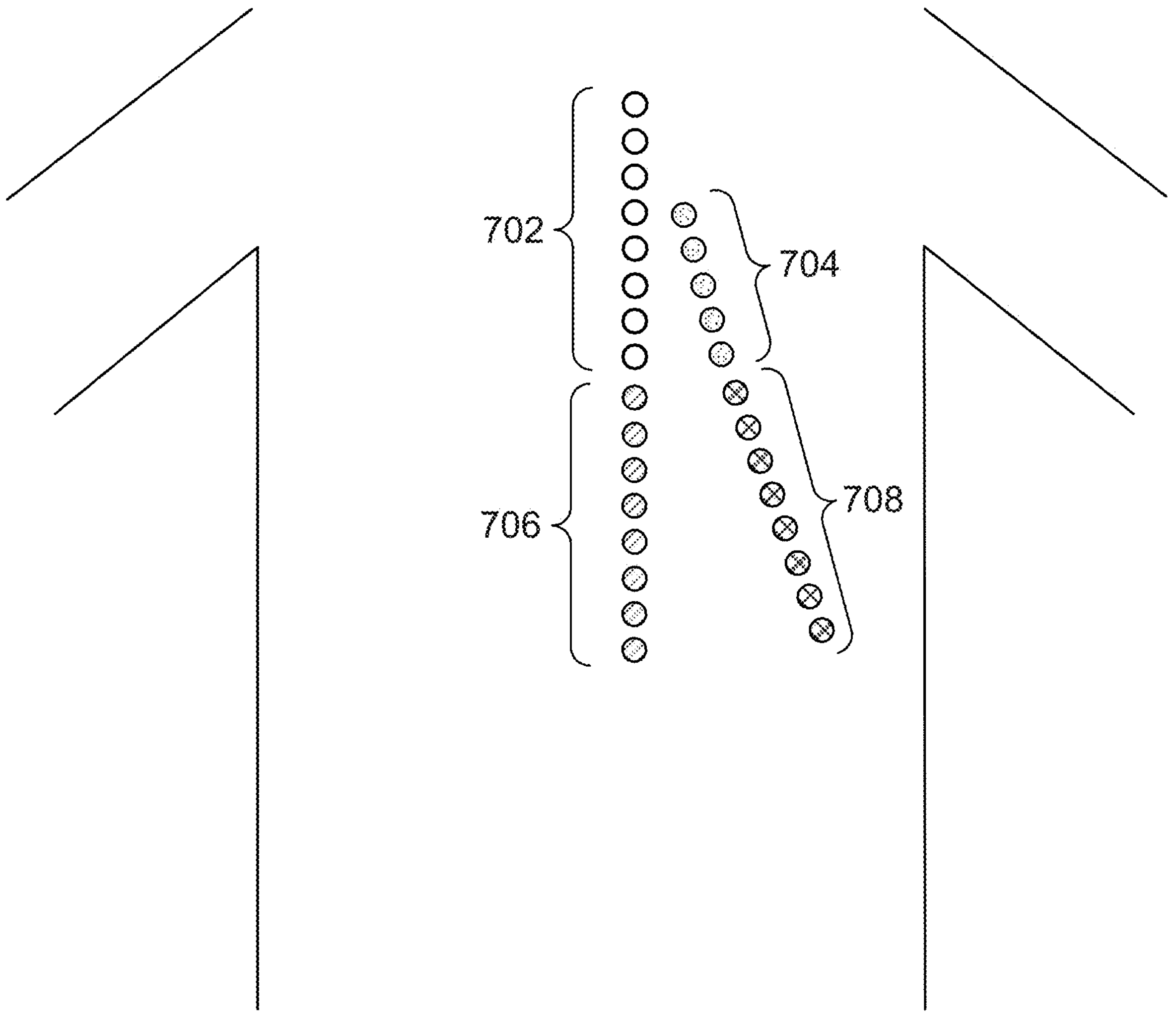
FIG. 7A illustrates an embodiment of transitioning from a previous stroke to a next stroke.

FIG. 7A illustrates an embodiment of transitioning from a previous stroke to a next stroke. In this example suppose a stroke that has just finished or completed. The stroke's original trajectory is shown at 702. During this stroke, the user adjusted the trajectory such that it completed according to the trajectory shown at 704. Now suppose that a next stroke is to be performed. The preconfigured or original trajectory of the stroke to be performed is shown at 706. Suppose that the next stroke to be performed is to continue on from the previous stroke. Suppose also that the flag for adjustment is still true. In this case, the adjustment is maintained, resulting in a trajectory 708 that deviates from trajectory 706, and that continues from trajectory 704. For example, the offsets applied on the previous stroke (that resulted in trajectory 704) are maintained from one stroke to the next. In this way, if there are multiple strokes back-to-back, and the user desires for the segment to be adjustable, this can be facilitated by maintaining the adjustment flags, so that all of the strokes in the segment maintain offsets between strokes (where the offset is not reset between strokes). In some embodiments, the offset flag is specified at the stroke level. The adjustability may be specified at various levels as well. For example, in addition to adjustability at an overall stroke level or the stroke in its entirety, subsets or portions of a stroke may be specified as adjustable.

Transitioning to a Next Stroke that is not Adjustable

Figure 7B:
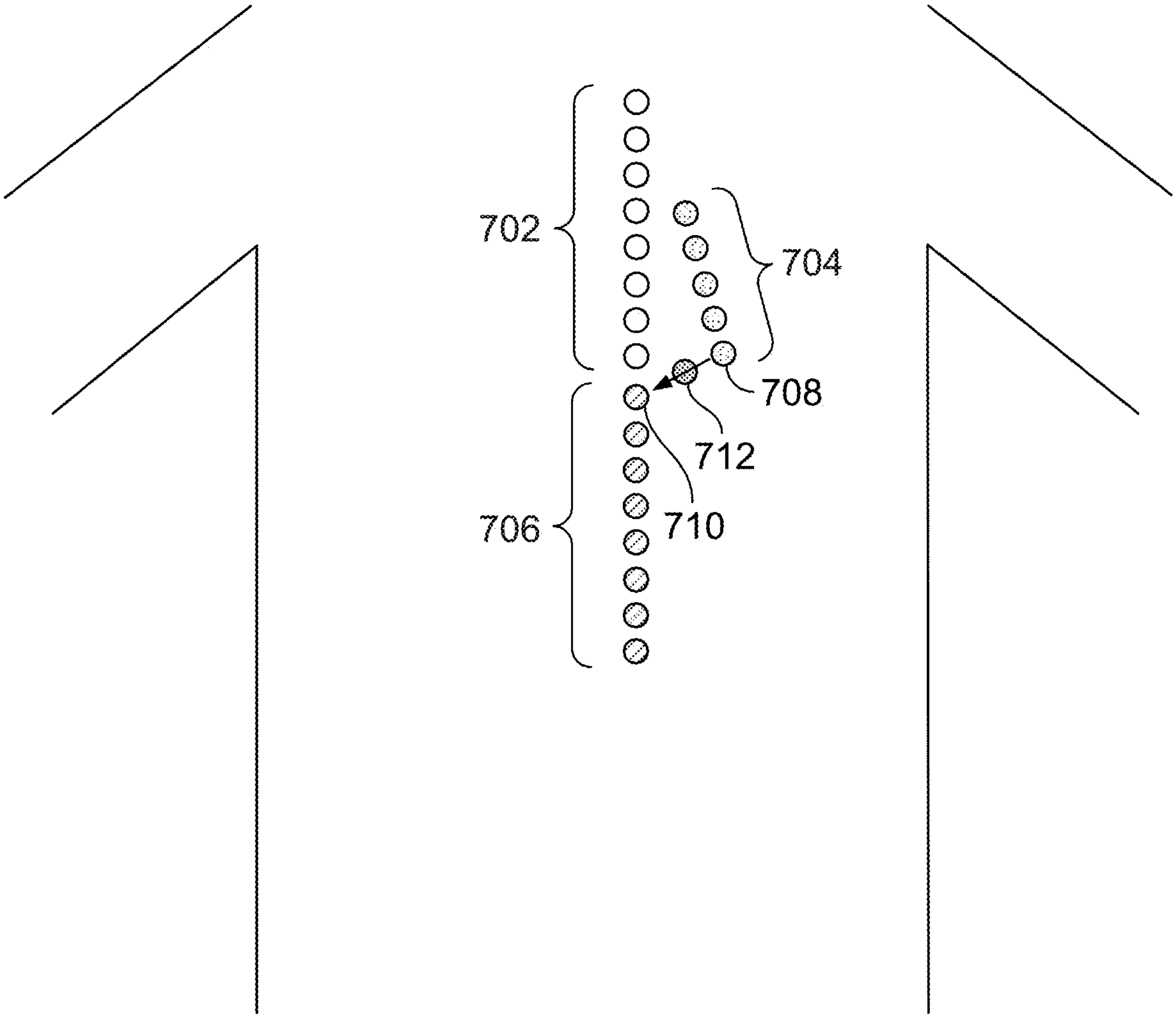
FIG. 7B illustrates an embodiment of transitioning from a previous stroke to a next stroke.

FIG. 7B illustrates an embodiment of transitioning from a previous stroke to a next stroke. Suppose that in this example, a previous stroke with trajectory 704 (adjusted from preconfigured trajectory 702) has completed. Suppose also that the adjustability flag for the next stroke is set to false, and thus the next stroke to be performed is not adjustable. That is, the robotic massage system is configured to perform the next stroke according to the preconfigured trajectory 706. In this case, however, if the robotic arm directly moves from the end position of the previous stroke at 708 to the beginning position of the next stroke at 710, while maintaining contact with the user's body with a certain level of pressure, this will result in a discontinuity or jump between the previous goal 708 and the next goal 710. For example, if the discontinuity or gap is several inches, given that goals are played at 30 Hz, this will result in a large acceleration of the arm. If the end effector is still touching the user's body, this large acceleration may be unsafe or uncomfortable.

The following are embodiments of handling such discontinuities. In some embodiments, when transitioning between goals of two strokes (e.g., from an end position of one stroke and a start position of a next stroke), continuity checks are performed, and various motion or jump thresholds are enforced. Examples of maximum thresholds that are enforced include maximum thresholds for:

velocity (dx/dt)

acceleration (dv/dt)

jerk (da/dt)

change of force over time (dforce/dt)

In some embodiments, there is a maximum value that is allowed for each of the above continuity parameters. In addition to such continuity thresholds being enforced to facilitate continuity between strokes, in some embodiments, the continuity thresholds are also enforced at all times between each successive goal.

The following is an example of enforcing such continuity thresholds. As one example, suppose a first goal 708. The first goal is at a first corresponding position. Suppose a next goal 710, with a different position. The difference in position over the difference in time is determined. In some cases, the difference in time is implicit, as there may be a maximum allowed difference between goals. If the change in position exceeds the threshold (e.g., threshold dx/dt), then in some embodiments, rather than jumping from the first point 708 to the next point 710, the robotic massage system determines a vector between point 708 and point 710, and generates and introduces interpolated robotic goals along the vector. The hardware is then controlled to move along that vector as far as allowed (within the continuity constraints), such that the actual next goal that is played is an interpolated goal (e.g., interpolated goal 712). In this example, the requested goal (preconfigured starting position of the next stroke) is approached, but is not necessarily jumped to directly (in order to prevent the continuity thresholds from being violated).

Architecture Implementation of Robotic Massage Adjustment

The following are embodiments of how an adjustment of a robotic massage is implemented with respect to the robotic massage system architecture shown in FIG. 2.

As described above, in some embodiments, a stroke is implemented as a series of goals. The goals are played one by one by command level (222) of the architecture described in conjunction with FIG. 2. The goals are played by sending them to the lower-level control level (214), where they are then converted into torque control signals used to drive the physical hardware (e.g., linear rail, arms, touchpoints of hardware layer 202). In some embodiments, layer 214 is also configured to publish state positions to the system.

In some embodiments, before a goal is sent from the command level (222) to the control level (214), a trajectory adjustment is effected by modifying the position of the goal to be implemented. For example, when determining a goal to send to the control level, the command level is configured to determine whether there is an offset to apply.

The command level also determines whether there are any thresholds to apply for determining the next goal to be sent to the hardware control level. For example, the aforementioned thresholds (e.g., velocity, acceleration, jerk, change in force) are enforced. The following are embodiments of enforcing the continuity thresholds described above. For example, the next goal is compared to the three previous goals to determine the first, second, and third motion derivatives (velocity, acceleration, and jerk) described above. It is then determined whether the next goal (which is initially based on a requested user offset) is in compliance with the thresholds for position jumps, velocity jumps, and acceleration jumps described above.

In some embodiments, the trajectory adjustment is executed by command manager 224, which makes a service call to trajectory adjustor 226 to determine whether a next goal is to be adjusted, and if so, how. For example, the trajectory adjustor takes a next goal as input, and returns as output an adjusted goal based on the requested user offset, specified thresholds, etc.

In some embodiments, the command level (222) operates at the stroke level. The command manager (224) executes the stroke by passing one goal of the stroke at a time to the trajectory adjustor 226, where the command manager 224 calls trajectory adjustor 226 to determine whether an adjustment is to be made to the trajectory (by modifying the robotic goal to be played due to user constraints or requirements), and if an adjustment is to be made, how to enforce a certain level of continuity within that trajectory. As described above, in some embodiments the trajectory adjustor is configured to take as input the last three played robotic goals, as well as the next robotic goal to be played, as input (where the previous three goals are used to determine velocity, acceleration, jerk, and change in force as described above), and adjust the robotic goal to be played to conform to, or otherwise satisfy, the user desired offset, continuity constraints, boundary conditions, etc. The adjusted or modified next robotic goal is then sent to the hardware control layer 214 for control of the linear rail, one or both robotic arms, and/or one or both end effectors.

Force-Velocity Relationship in Robotic Massage Adjustment

The following are additional embodiments of implementing robotic massage adjustment. As one example, the speed to move the hardware from one position to the next and/or the amount of force being applied is taken into consideration. For example, when there is a certain touchpoint orientation or pressure that is being enforced, it may not be desirable to adjust the hardware at a certain level of speed. As one example, suppose that the robot is performing a stroke for deep compression, where the robotic massage system is applying a large amount of pressure into the body. That is, as part of the deep compression, the robot runs or plays a goal that pushes down at full force. Suppose that the user would like to adjust the stroke to the right or to the left. Performing a robotic goal adjustment at this point may cause discomfort or pain. Because the user may be hurt, the robot should not adjust its position while also maintaining that force. Instead, in some embodiments, the force is lowered between goals. For example, the movement of the robotic hardware and the force that is applied are inter-related. For example, the velocity and force are related by a function. In other embodiments, the movement and force are controlled as orthogonal elements of the robotic massage system.

In another embodiment, the stroke is paused, and interpolated robotic goals are generated and inserted between the current position and the adjusted next robotic goal position. In this case, the adjustment can be allowed to occur, irrespective of the stroke. The stroke is then resumed. In some embodiments, as part of the adjustment process, default values are used with respect to force to allow the desired motion/change in position. The default force value may be dependent on the touchpoint.

In another embodiment, a saturation or threshold approach is taken. For example, a relationship between force and velocity is established via a function. If an adjustment is desired that causes the velocity to saturate (e.g., meet or exceed a threshold velocity such as that described above, in which case the robotic arm is only allowed to move at the max velocity), then force is also decreased automatically. Once the adjustment is completed, then the stroke continues on with the specified force and/or velocity.

In some embodiments, allowing the force and velocity to be related to each other may decrease the duration of the treatment of a stroke. For example, if the stroke is 30 seconds, but the user made adjustments for 10 seconds of that time (during which time the force was reduced), then the user is only receiving 20 seconds of therapeutic benefit (at which the appropriate full force was used, and not decreased for adjustment purposes). For example, the stroke length is the same, but the time at which the appropriate pressure was applied is less. The treatment would change, as the force over time would change. In this case, the stroke may be paused, and then moved.

In other embodiments, intermediate goals are added in, or the duration of an expected goal is increased, in order to maintain the same length of effective treatment. For example, while force is decreased due to an increase in velocity, goals are added proportional to the ratio by which force has been reduced.

This may be move dependent, as for some strokes, such as an effleurage, where the therapeutic goal of the system is to relax and move up and down the body, then a different version of the adjustment would be performed. For example, effleurage strokes generally are fast moving and low force. In the case of effleurage, in some embodiments the user adjustments are delayed to be on the next pass of the stroke versus the current one. That is, in some cases, a version of the adjustment causes the stroke to take longer. In other versions of the adjustment, the stroke length is not affected.

Incorporation of Body Information when Adjusting Robotic Massage

In some embodiments, information about the body is incorporated into the determination of how the robotic arms are adjusted. For example, information about the body (e.g., from a model of a subject's body) is also used as context to affect the adjustment to the robotic goal.

The following are embodiments of incorporating information about the body of the subject when adjusting robotic goals. As will be described in further detail below, incorporating body information when adjusting robotic goals provides various benefits, such as ensuring that consistent contact of the end effector with the subject is made, or that a desired therapeutic effect of the application of the end effector is maintained (or is not reduced) even with the adjustment.

In the above example of FIG. 4A, the adjustment user interface was represented in two dimensions. For example, the user's body is rendered as a flat surface in the user interface. Further, the user controls are defined in a two-dimensional (2D) plane, where the user specifies a desired planar X offset and a Y offset. In the above examples, the 2D user input was then used to determine a 2D offset to a next robotic goal. For example, given a user X-offset and Y-offset, a robotic goal was also adjusted in the X and Y axes.

While a user's body is three-dimensional, with various contours, having a 2D representation of the body in the user interface provides various benefits. For example, providing the user a 2D control interface prevents users from being overwhelmed, and provides an intuitive interface for them to use. While the user interface may be configured in some embodiments to allow the user to adjust in three dimensions, this may be complicated for some types of input devices. For example, while in some embodiments the user interface is in three dimensions, this could be challenging for users to interact with on a user interface screen such as a tablet that is in two dimensions.

Thus, in some embodiments, to simplify the experience for the user, the user's body is shown in a flat plane, and the ability to adjust or "nudge" is also planar, in two dimensions. Making an adjustment in two dimensions may feel more natural to the user, where they may make adjustments to go higher up, down, left, or right on their body (e.g., from a top-down perspective, as shown in the example of FIG. 4A), as users often think in the surface of their skin.

In the example of FIG. 4A, the curvatures of the body are flattened in the representation of the user in the input device. Similarly, via the input device, the user provides commands to make adjustments in a plane that is flat. If the robotic goals are adjusted in a region of their body that also happens to be flat, then the robotic goal adjustment determined from the user's input commands will maintain a relatively same or similar amount of contact between the end effector and the user. This may not always be the case, depending on where on the body the local robotic adjustment is being performed, as will be described in the examples of FIGS. 8A and 8B.

Figure 8A:
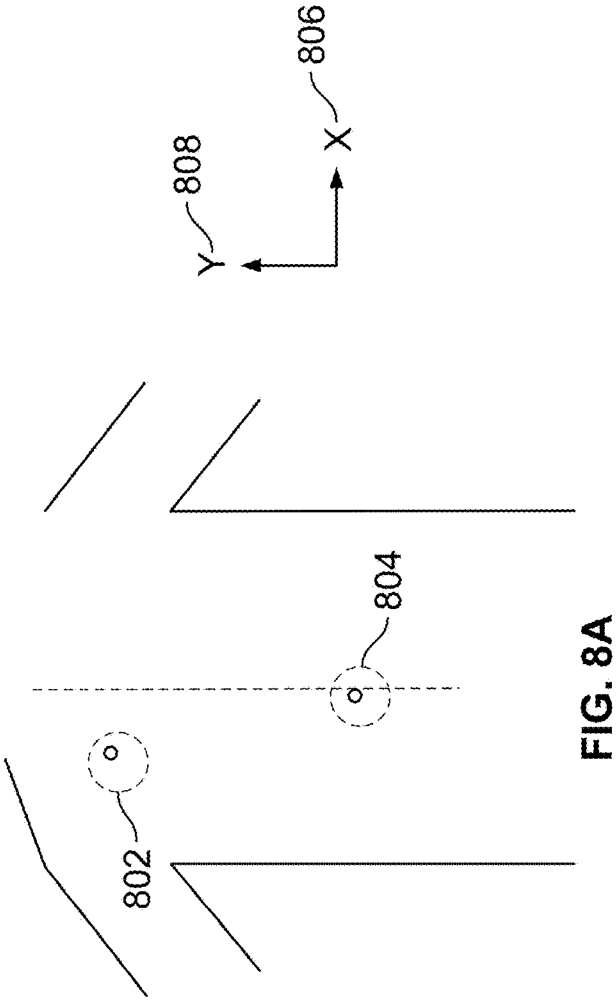
FIG. 8A illustrates an embodiment of adjusting in a 2D plane.

In the example of FIG. 8A, a top-down view of a user who is lying prone (face down) is shown. In this example, a flat, two-dimensional representation of the user's upper back and shoulders is shown. In the example of FIG. 8A, user inputs and controls for nudging or adjusting are in the X axis (806) and Y-axis (808).

Figure 8B:
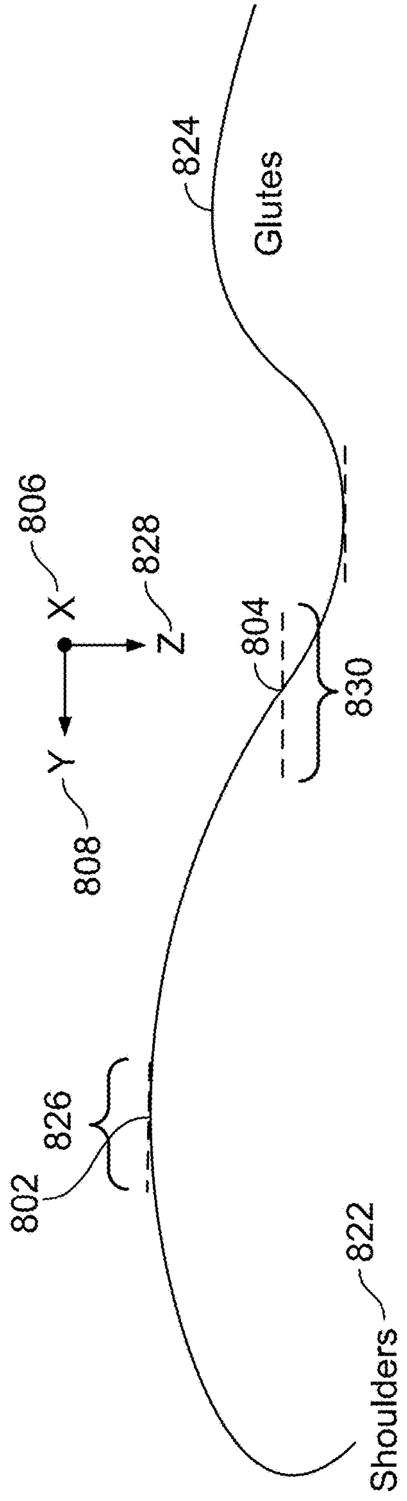
FIG. 8B illustrates an embodiment of body curvature.

FIG. 8B illustrates an embodiment of a side profile view of the portion of the user's body shown in FIG. 8A. In this example, a side view of the user surface is shown, where the user is face-down (prone, as in the example of FIG. 8A).

Curvatures of the body are shown in the example of FIG. 8B. For example, the user's shoulders are shown at 822. The user's glutes are shown at 824. As shown in this example, the curvatures of a user's body may differ at different parts of their body. In this example, the Y-axis 808 of FIG. 8B corresponds to the Y-axis 808 of FIG. 8A. The X-axis 806 of FIG. 8A is into/out of FIG. 8B. The Z-axis, which corresponds to elevation and height changes of the robotic device relative to the surface of the body, is shown in the example of FIG. 8B at 828.

Suppose, for example, that the robotic device is currently performing or implementing a robotic goal at location 802 of the user's body as shown in FIG. 8A. The user would like to "nudge" the robotic device. The user, via the interface, makes their adjustment in a 2-dimensional X-Y plane, as allowed by the input device. In this example, suppose that the user makes an adjustment to move the point of contact along the Y-direction.

As shown in FIG. 8B, the region 826 is the area around the location 802. In this example, region 826 is relatively flat. Even if the robotic goal were adjusted in only the same Y-axis dimension (and not upwards or downwards according to the Z-axis), the end effector will still maintain contact with the surface of the user's skin. However, when moving toward the user's shoulders beyond region 826 in the Y-axis, the user's body begins to curve downwards. If the next robotic goal were adjusted beyond region 826 in only the Y-direction, in the direction of the shoulders, then the end effector would make less contact with the user's body, resulting in a potentially less consistent or less effective experience.

As another example, suppose that the user is making an adjustment when the end effector is at location 804, as shown in the example of FIG. 8A. As shown in the side profile view of FIG. 8B, there is more curvature in the region 830 about this location on the user's body. If the robotic goal is adjusted only in the Y-dimension that the user's input specifies, without considering the elevation change (Z-axis) of the user's surface in the direction of adjustment, then the amount of contact made by the end effector with the user's skin will differ, and the user may receive an inconsistent experience. For example, if the robotic goal were nudged along the Y-axis toward the shoulders along line 830, without adjusting in the Z-axis (e.g., by rising with the body), then the end effector will run into the user's body, rather than along the surface of the skin. If the robotic goal were nudged along the Y-axis toward the user's glutes, but without adjusting in the Z-axis (e.g., by lowering with the body), then the end effector will have less contact with the user's skin surface. Thus, if the robotic goal adjustment is restricted to the same axes as the user input, without considering information about the user's body (e.g., elevation changes), the experience of adjusting the robotic device will vary depending on the degree of flatness of the surface of the skin at the position of the robotic goal where the adjustment is occurring.

As shown in the examples of FIGS. 8A and 8B, given the contours and height changes of the body, depending on where on the subject's body the adjustment is being commanded, modifying robotic goals without taking into account information about the user's body curvature (e.g., by only modifying the next robotic goal in the X-Y plane) may cause the end effector to have reduced contact with the skin (e.g., because the user's surface happens to be a dip where the robot is adjusting to), or cause the end effector to run into the user's body (e.g., because the user's surface happens to be rising where the robot is adjusting to). This may result in not only an inconsistent feel to the user, but may also impact the efficacy of the massage.

As part of performing the adjustment, it would be beneficial if the level or amount of contact between the end effector and the surface of the user's body could be maintained when performing the adjustment. For example, it would be beneficial if, as part of performing a nudge, the end effector were to maintain contact with the surface, or maintain a consistent amount of contact with the surface throughout the adjustment.

In some embodiments, this is facilitated by incorporating information about the user's body with the user's input command when determining how the robotic goal is to be adjusted. For example, the user's input may not include additional information about the body (e.g., elevation changes, underlying musculature, etc.). In some embodiments, in addition to taking as input the user's 2D input offset, the robotic system utilizes information about the user's body (e.g., via a model of their body) to determine how to control adjustment of robotic goals.

The following are embodiments of incorporating information about the body when determining adjustments of a robotic goal such that consistent contact is maintained with the user's surface.

As will be described in further details below, the information about the subject's body may be used in various ways to affect the modification of robotic goals. In some embodiments, the system uses the body information to limit adjustment of the robotic goal to a region that is relatively flat, such that even if the robotic goal is adjusted within the same dimensions as the user input, contact will be maintained. As another example, the system uses the body information to interpolate robotic goal adjustments in additional dimensions (beyond, for example, the user X-Y axes input). For example, the system uses the body information to determine Z-axis adjustments, adjustments to end effector orientation, adjustments to force, or any other dimensions by which the robotic arms are controllable.

The following are embodiments of incorporating body information into the adjustment of robotic goals in response to a user input requesting adjustment of a robotic massage, as well as embodiments of utilizing body information to determine hardware offsets of robotic devices.

Embodiments of Body Information

The following are embodiments of maintaining information about a subject's body. In some embodiments, information about the subject's body is captured in various models. In various embodiments, the information about the subject's body is also captured in a variety of coordinate frames. The following are embodiments of how the user's body information is captured in various representations and coordinate systems.

The data for robotic massages may be stored and manipulated in various coordinate systems, three examples of which are Cartesian, barycentric, and UV. For example, the robotic massage system may move between these coordinate frames for various purposes and types of processing in different parts of a massage data pipeline. For example, stroke retargeting (e.g., from a canonical body model to the specific body of the user upon which therapeutic massage is being performed) is performed in one coordinate frame, while adjustments are made with respect to another coordinate frame.

The surface of the body is a warped surface. In some embodiments, the body's surface is mapped into a barycentric and/or UV coordinate system. The barycentric/UV coordinate system representations of the body thus incorporate information about the body of the user (e.g., how the user's surface changes in 3D space).

Figure 9:
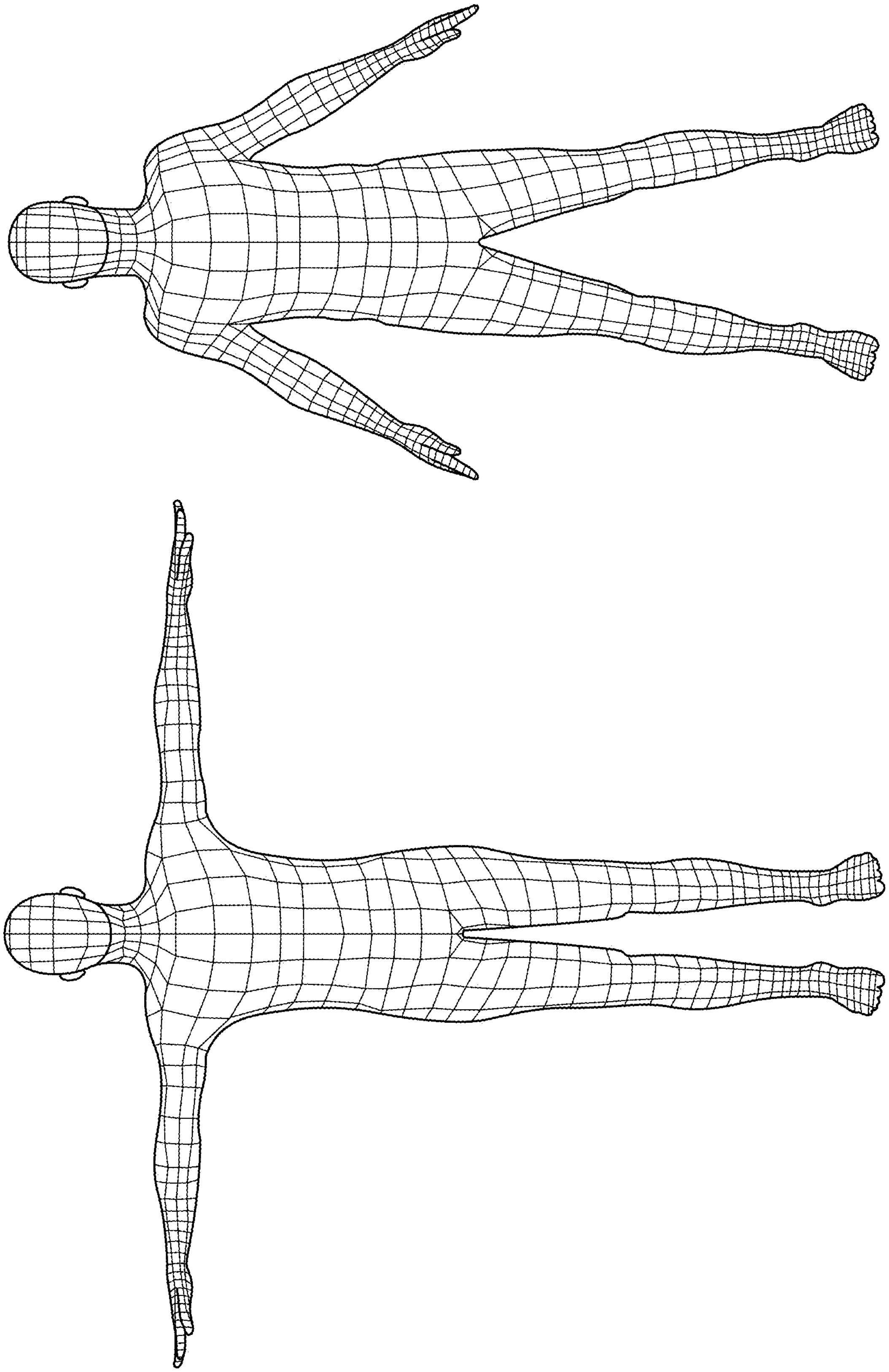
FIG. 9 illustrates an embodiment of a body model.

FIG. 9 illustrates an embodiment of a body model. In some embodiments, the robotic massage system creates a model of the body. This includes using a barycentric mesh, with an associated barycentric coordinate frame or system.

In some embodiments, massage data is associated with the aforementioned body model. In some embodiments, the body model is based on the SMPL (skinned multi-person linear) model.

The following are various embodiments of massage trajectory representations. As will be described in further detail below, using the representations described herein, adjustability while accounting for body curvature is facilitated.

Figure 10A:
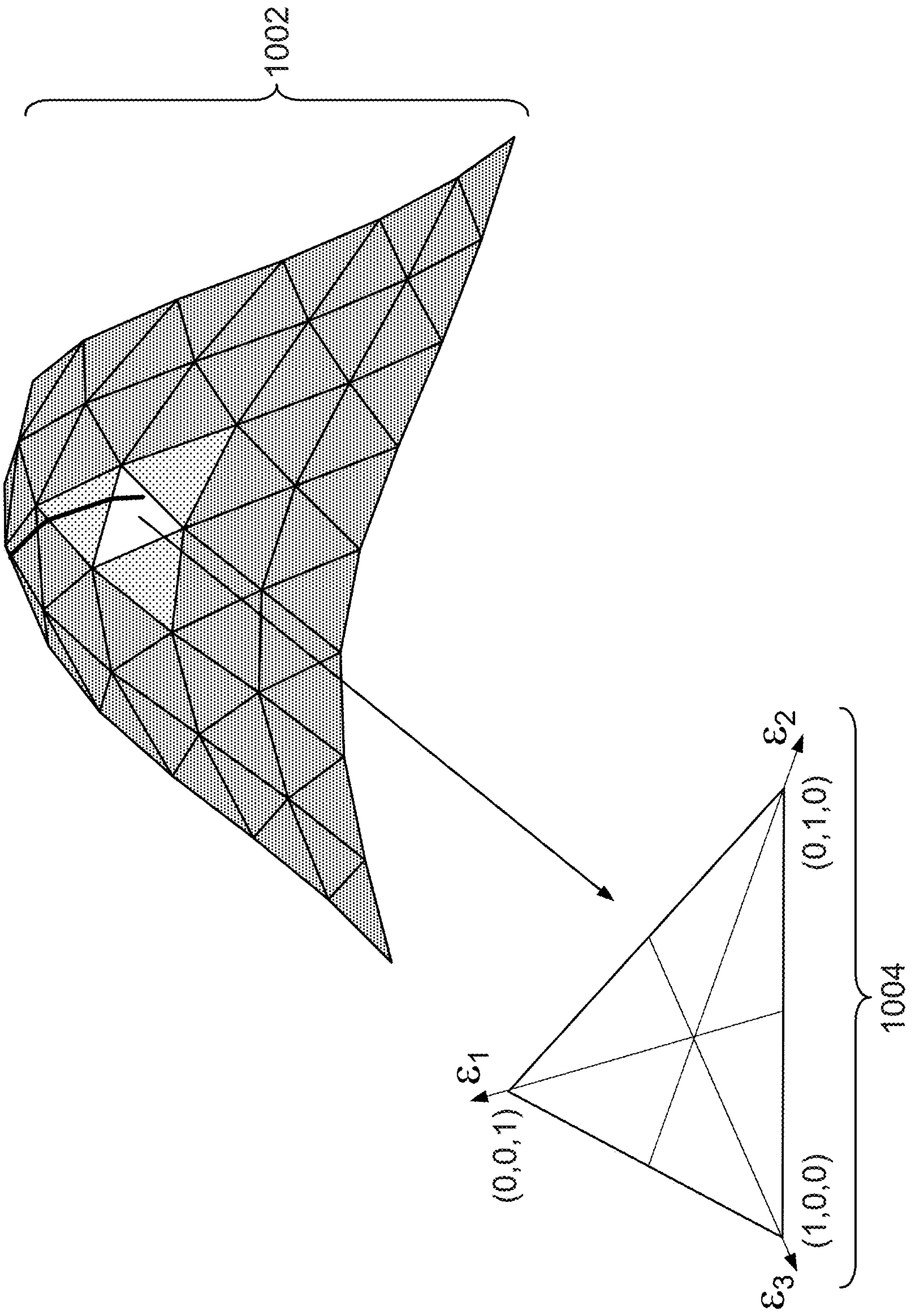
FIG. 10A illustrates an embodiment of a barycentric trajectory representation.

FIG. 10A illustrates an embodiment of a barycentric trajectory representation. In this example, a mesh 1002 is composed of individual triangles. Each triangle, such as triangle 1004, is associated with vertices and edge weights. The vertices are tied together. In some embodiments, distances are defined relative from the mesh, normal to the triangle. For example, positive distance is not in contact with the body. Negative distance is inside the body (e.g., tissue compression). In some embodiments, each triangle is associated with a triangle identifier (ID).

The use of a barycentric trajectory representation allows the robotic massage system to represent trajectories on a generic canonical body model, which can then be mapped between different morphologies (e.g., specific user bodies). The barycentric trajectory representation is also readily convertible to other spaces, such as Cartesian spaces.

In some embodiments, positions (e.g., position information within the robotic goal or stroke goals) are upheld relative to the barycentric coordinate frame. In some embodiments, the barycentric representation is unfolded, resulting in a type of 2D plane that is equivalent to the surface of the body. Such a coordinate frame may also be used for the surface of muscles if multiple meshes are utilized. For example, meshes may be developed for erectors, rhomboids, traps, etc.

In some embodiments, as described above, the massage robotic system uses a skin-based model of the entire body. In some embodiments, trajectories are generated relative to the barycentric mesh. The following is an example of generating a trajectory relative to the barycentric mesh. In some embodiments, the barycentric mesh is unfolded into a UV space that is two-dimensional, using UV mapping. This results in a UV representation of a trajectory. In some embodiments, the UV trajectory representation is a continuous representation that can be manipulated and mirrored, where specific regions can be easily avoided or focused on.

Figure 10B:
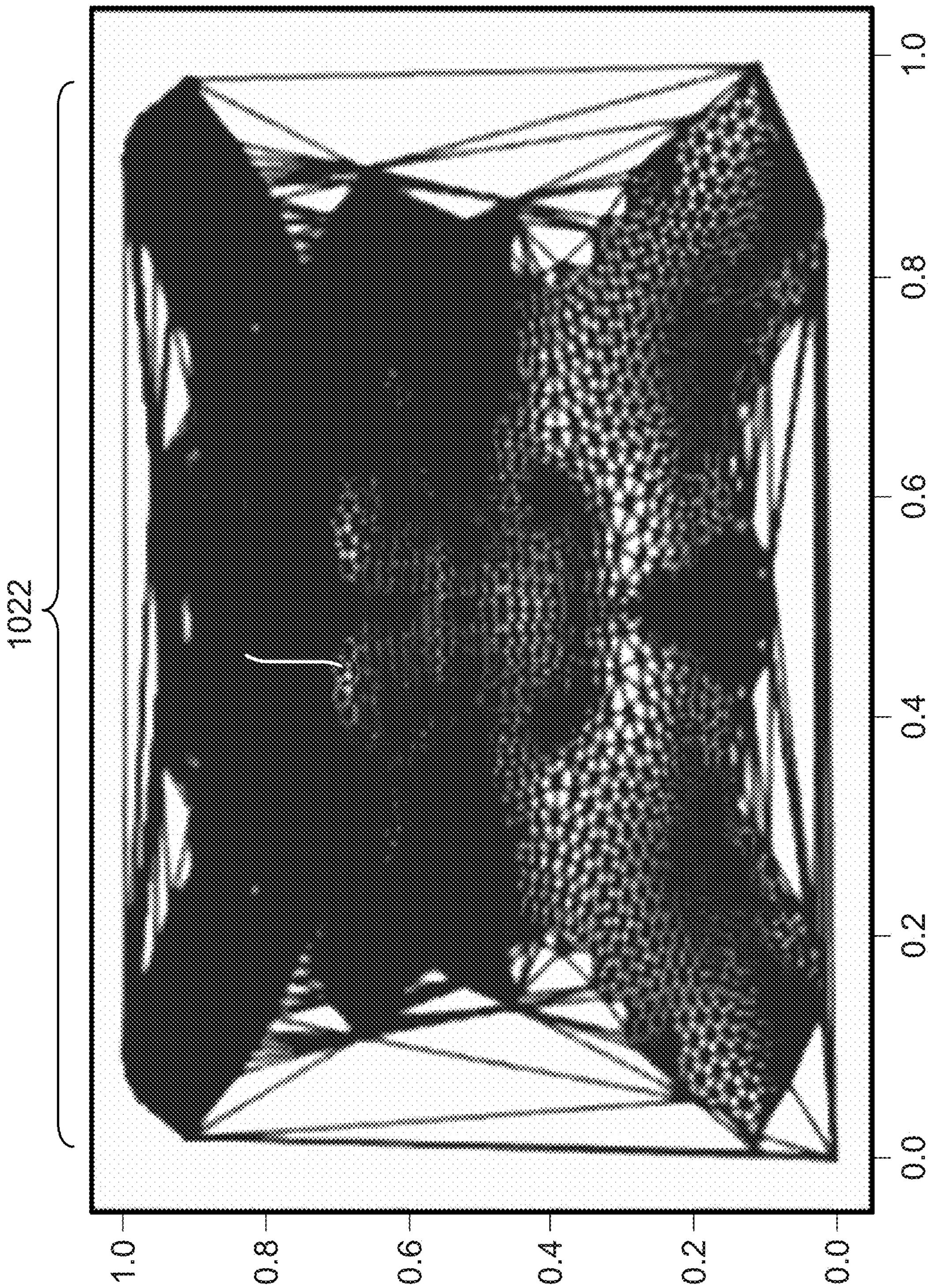
FIG. 10B illustrates an embodiment of a UV trajectory representation.

FIG. 10B illustrates an embodiment of a UV trajectory representation. In this example, the barycentric mesh of FIG. 10A is unwrapped or flattened into the UV representation 1022 shown in FIG. 10B. In some embodiments, a texture map is generated from an SMPL model mesh. In some embodiments, this trajectory representation is continuous, and facilitates interpolation, mirroring, and avoiding or focusing on specific regions. This allows for a trajectory representation on the surface of the body model to be used by the robotic massage system.

Figure 10C:
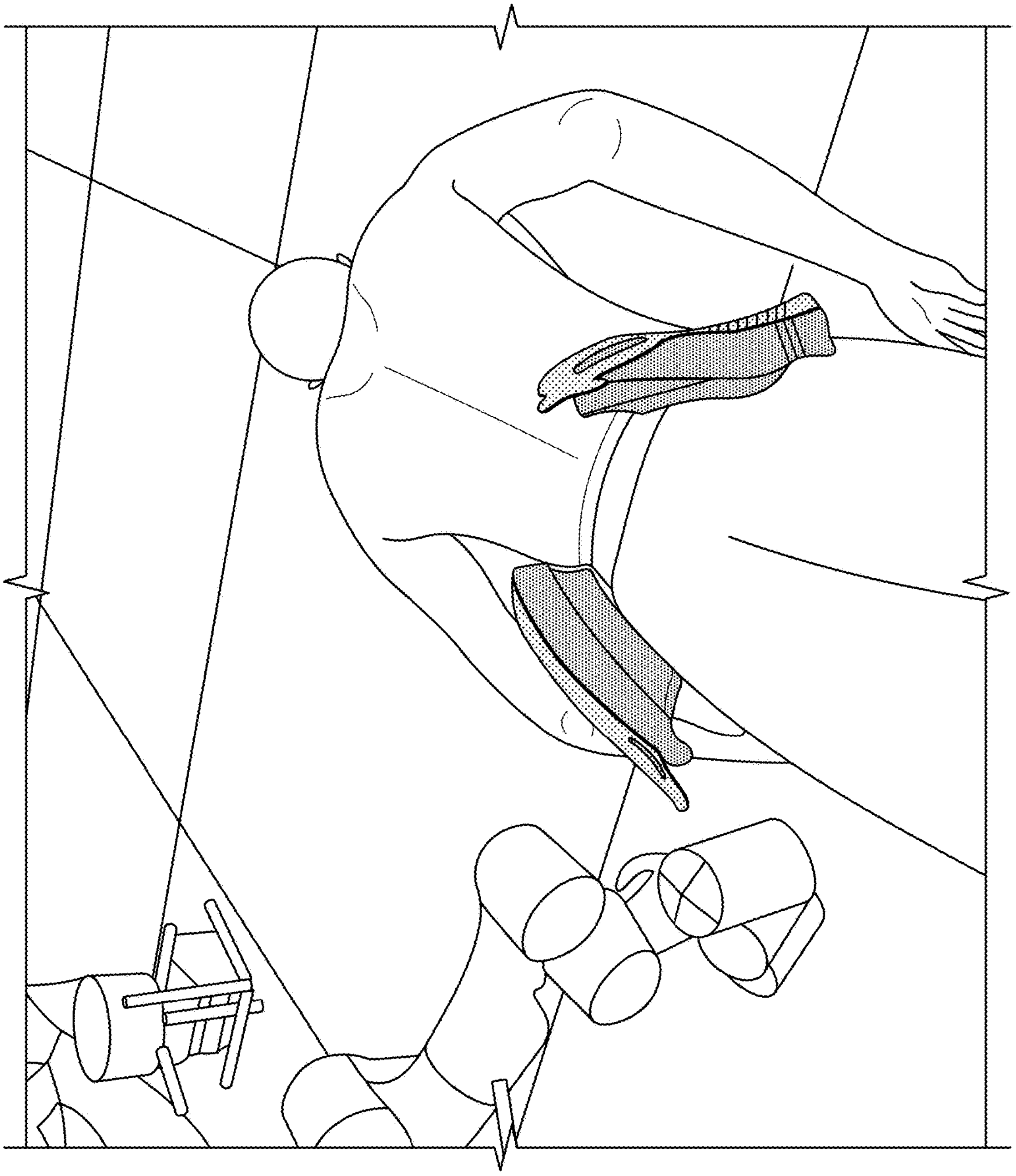
FIG. 10C illustrates an embodiment of a Cartesian trajectory representation.

FIG. 10C illustrates an embodiment of a Cartesian trajectory representation. In some embodiments, robotic goals are sent to the robot (e.g., hardware such as arms, end effectors, and/or linear rail) in a Cartesian space. This is beneficial for visualizing and plotting trajectories. The following are embodiments of generating a goal in the Cartesian space.

In some embodiments, a trajectory is projected into the UV space. A robotic goal is projected into the UV space. Interpolation is then performed to convert the goal into a Cartesian space. In this way, by generating the Cartesian goal from a UV representation of a barycentric model, the goal will equate to the 3D surface of the body. This is one example way of incorporating body information into determination of robotic goals.

For example, Cartesian coordinates for goals are determined according to the UV space, which is a bridge between the 3D barycentric space and multidimensional Cartesian space. This allows translation of trajectories into Cartesian coordinates, allowing adjustments to be defined by X and Y offsets. In this way, for example, a 2D spot can be utilized to reliably determine a position on the skin.

In some embodiments, to move or adjust the position of one or more of the arms, a scalar value is sent and propagated to the hardware, which performs the actual adjustment of the trajectory, such as left, right, up, and/or down (e.g., in a plane relative to a top-down view of the user, as shown in the example of FIG. 4A). As one example, the adjustment is implemented in a Cartesian coordinate frame.

The robotic goals are specifiable in a variety of dimensions. In some embodiments, the robotic goals include depth. In some embodiments, in performing interpolation, the depth projection is determined off the body, and then projected back to the surface.

In some embodiments, goals also include orientation. In some embodiments, a combination of interpolation is performed, including interpolation in the linear space for orientation, along with interpolation in the UV space for a position on the skin, as well as a model distance (distance from the surface of the skin) that is interpolated at the Cartesian space.

Thus, in some embodiments, there is a mix of three different interpolations that are occurring at once between the UV, barycentric, and Cartesian coordinate frames, where there are interpolations for position, orientation, and then model distance (distance from the surface of the skin). As shown in the various examples and embodiments described herein, the robotic massage system maps between UV space, barycentric space, and Cartesian space for various data processing.

The encoding of the body information of the subject (e.g., curvatures) is used for various processing, including for determining modifications to robotic goals in response to user commands to offset the robotic arms, as will be described in further detail below.

Limiting Bounds of Adjustability Based on Body Information

As described above, in some embodiments, saturation points for the amount of allowable offset are configured. In some embodiments, the bounds are based on the maximum allowed physical deviation of the hardware (e.g., based on range of motion of the arms, rails, and/or end effectors). In some embodiments, information about the body (e.g., from models of the body, such as those described above) is also used as context to affect the adjustment to the robotic goal. For example, in some embodiments, the bounds of adjustability are different for different parts of the body. In some embodiments, the bounds of adjustability are determined based on a model of underlying musculature and skeletal forms (e.g., such as the models described above). In various embodiments, based on such a model (or models), the adjustability bounds are dynamically set based on the work that is being done, the clinical presentation of the user, the intention of the work, etc. That is, the bounds of adjustability are context aware (e.g., based, in various embodiments, on the context of the user and their physiology, the context of the massage being done, etc.).

As one example, the adjustment of the robotic goal is determined based on physiological metadata at the region of the robotic goal, such as the grain of the muscle at that point, what is surrounding the muscle, what are expected attachment points, etc. This allows an adjustment to be conducted in a manner that takes into account the context of the underlying physiology, but without requiring the user to know about their underlying physiology when they are making their user requested offsets via the input device. Limiting the bounds of robotic offsetting based on body information allows the robotic adjustment to be more robust (e.g., consistent contact between the end effector and the subject is maintained before and after the adjustment).

As described above, in some embodiments, the user's body information is used by the system to provide boundaries to hardware adjustment of the robotic goal (even if the user's input would result in X-Y offsets that would exceed such bounds). The bounds are determined so that adjustment in the permissible region of adjustment would still result in a consistent amount of contact with the user's surface. As one example, the body information is used to determine the region 826 of FIG. 8B to determine the bounds of adjustment.

As another example, whether or not a stroke is adjustable is determined based on whether the stroke is to be performed on a portion of the body that is determined to be relatively flat across other observed users. For example, if the stroke is to be performed on a relatively flat portion of the body (e.g., according to evaluation of the contours of a body model such as that described above), then the stroke is permitted to be adjustable (e.g., its adjustability flag is turned on). On the other hand, if the stroke is to be performed on a portion of the body that is determined to not be sufficiently flat, then the flag for adjustment of the stroke is turned off. As shown in this example, in some embodiments, the bounds of adjustability are also determined based on the relative flatness of the region in which the goal is being performed on the user's body. For example, the adjustment boundaries are limited to where the body is flat, and do not extend to where the body begins to curve beyond a threshold amount.

If the adjustment is limited to a relatively small region (where in some embodiments the bounds of adjustment are determined based on body information), or the adjustment is performed in an area of the user's body that is relatively flat, then adjusting the robotic goal in two dimensions may not result in noticeable discontinuities in terms of contact between the end effector and the subject's body. For example, the robotic goals may still be adjusted in two dimensions (e.g., in the X-Y plane as shown in FIGS. 8A and 8B), but the boundaries or limits of adjustment are determined based on the information about the body to regions that are relatively flat, with only small changes in elevation.

By limiting bounds of adjustment, Z-axis changes (e.g., Z-axis as shown in the example of FIG. 8B) due to curvature of the robotic device need not be computed. For example, suppose the user input indicates a planar X offset and a Y offset via the input device. The robotic goal is specified not only in X and Y axes, but also the Z axis. In some embodiments, if the offset is limited to being in a relatively flat region, then the next robotic goal need only be updated in the X and Y coordinates, and not the Z coordinate (where the Z-coordinate can stay the same). For example, if a current goal is (X, Y, Z), the updated goal would include (X', Y', and Z), where X' is X+X-offset, and Y' is Y+Y-offset, but the Z value remains the same.

Interpolating Dimensions of Robotic Offsets

In the examples described above, the user's 2D input results in a corresponding 2D adjustment of the robotic goal. That is, the next robotic goal is offset in dimensions that are the same as the user command received via the input device. As described above, in some embodiments, consistent contact between the end effector and the subject is maintained by limiting the movement of the robotic arm to be within bounds determined by information about the body of the subject (e.g., based on a determination of a region of relative flatness of the user's body). While robotic goals are shown in the above examples being adjusted in the same two dimensions as that of the user input, they are adjustable in more than two dimensions. As one example, the position of a robotic goal of the robotic device may be defined in a three-dimensional (3D) Cartesian space, such as in X, Y, and Z axes. The orientation of the touchpoint may also be adjusted. The robotic goal is also configurable in other dimensions, such as wrench.

It would be beneficial in some cases if, in response to the user's two-dimensional offset, the robotic goals were modified in more than those two dimensions. For example, as described in conjunction with FIGS. 8A and 8B, if there is a significant amount of curvature in the area that the user is making an adjustment at, then moving the robotic arms so that the end effector is only offset in the X-Y plane may cause the amount of contact that the end point has with the user's surface to vary. This may result in discomfort, less effectiveness of the massage, etc.

As described above, the robotic arms are adjustable in numerous dimensions. For example, in addition to X and Y axis of motion, the robotic arms can also be moved in the Z-axis. The end effector orientation may also be adjusted. In some embodiments, when determining how robotic goals are to be adjusted, hardware adjustments in other dimensions not specified in the user input are also interpolated using body information such as that described above. This provides another way to ensure that consistent contact between the end effector and the subject is maintained given the user's request or command to adjust the trajectory of the hardware.

In the below examples, while the user input may be specified in two dimensions for the benefit of facilitating ease of user input, the robotic adjustment need not be limited to only being adjusted in the same dimensions as the user input. Instead, a combination of the (two-dimensional) user input and the information about the body is used to determine or interpolate additional higher dimensions of robotic goal adjustment (beyond the same dimensions as the user input). The incorporation of the body information is to ensure that adjustment requested by the user is implemented in a manner that also maintains consistent contact between the end effector and the surface of the user.

For illustrative purposes, the following are examples of incorporating body information to determine a Z-height adjustment of robotic goals to allow the robotic device to follow the contours of a user's surface during adjustment. In various embodiments, the body information is incorporated with user input information to determine other dimensions of robotic goal adjustment.

The following are embodiments of incorporating body information into the robotic arm trajectory/goal adjustment to determine a Z-axis adjustment (elevation adjustment) of the robotic arm/end effector. For example, adjustment of the robotic arm in other dimensions not specified in the user input/command are described below. The interpolation may also be performed even if the user command is specified in higher dimensions (e.g., three dimensional input).

In this example, the user-input adjustment plane is referred to as being an X and Y axis Cartesian coordinate frame (as shown in the example of FIGS. 8A and 8B). The position of the robot is also in a Cartesian coordinate frame, but may be of higher dimensions (e.g., three dimensions). In this way, the dimensions in which the hardware is adjusted are expanded beyond the dimensions of the user input. For example, given a 2D user input, by incorporating body information, a 3D modification to a next robotic goal is determined, where the third dimension (Z-axis offset) of the robotic goal is determined using the body information to ensure that the end effector maintains contact with the user.

As described above in conjunction with the example of FIG. 8B, the body has different curvatures, where there are spaces in and out of the body (e.g., valleys and crests). When in different areas of the body, the curvature may become more dramatic, and the robotic arm would encounter more or less resistance that is not being accounted for when moving from one location to the other if it is not also offset in the Z-axis. In some embodiments, the body information described is utilized when determining the modification of the next robotic goal to take into account the amount of offset on the surface of the skin or relative to a muscle given the direction of adjustment specified by the user's command.

As will be described in further detail below, even if the user input does not include a Z-axis command component, the Z-axis offset to apply to the next robotic goal is determined or interpolated by the system by using the user's input and the body information (e.g., to determine the Z-offset given the user input X-Y offset).

The translation of the robotic device may be considered as a form of re-targeting of the robot in real-time, where the adjustment or translation of the robot is not only based on the user's command (with a user requested X-offset and Y-offset), but also the body information.

That is, suppose that the user input is in the X-Y plane in the Cartesian space. However, the user input, which is in the Cartesian space, does not include any information about the body. In this example, to determine an actual robotic goal, in addition to the user input (which will determine the X-Y robot adjustment), another source of information (e.g., about the body) is provided to allow for the robotic Z-axis translation (if needed).

The use of body information results in an adjusted or updated X, Y, and Z value for the next robotic goal (whereas if the Z were not determined, then the updated goal would only have an updated X and Y value, but the Z value would remain the same, for example).

Determining Robotic Goal Adjustment in the Z-Axis by Converting Between Coordinate Systems As described above, information about a subject's body is captured in various representations, models, and coordinate systems. Examples of different representations include barycentric, UV, and Cartesian representations. In various embodiments, the robotic massage system moves between the various representations for various purposes. For example, the system converts trajectories (and the goals that make up the trajectories) between the various representations (e.g., by mapping goals from barycentric to UV to Cartesian) as needed.

In some embodiments, to determine the corresponding elevation changes (defined in these examples as a Z-axis change) of the body's surface given a user's X-Y nudge command, the user's X-Y command received via the input device is mapped into the UV coordinate system, for example, as a change in magnitude. A corresponding UV/barycentric coordinate is identified, which will include or take into account the elevation or curvature information about the user's body, as described above. That UV/barycentric coordinate is then converted back to the Cartesian coordinate system, and now includes a Z component. Thus, the use of the UV/barycentric coordinate frame has supplied the appropriate Z-component portion of the offset. The next robotic goal is then adjusted in the Z-component when performing the offset.

That is, in this example, a Cartesian X offset and Y offset are converted to a change in magnitude in the UV/barycentric space. An updated UV/barycentric coordinate is identified based on the user command. The new UV/barycentric coordinates are then converted back into the Cartesian space, now with an also updated Z axis change.

Adjustments performed in UV do not necessarily have a one-to-one mapping with the Cartesian space. For example, with respect to absolute distance, moving a certain magnitude in UV does not correspond to moving the same absolute distance in Cartesian. This may add complexity to feeling consistent, as there may be irregularities between the spaces. In some embodiments, the consistency between the UV and Cartesian spaces is adjusted based on the sizing of the mesh triangles.

For example, users may be of various different sizes, and thus their UV representation body models will differ. For example, different bodies will be represented in UV/barycentric with the same number of triangles, but different areas will have different densities of triangles (due to the differing amounts of space that various regions will take up across different people). For example, for a larger person, the triangles are larger. In some embodiments, mapping the user input to UV offset includes the use of a heuristic based on a measure of the person's size (e.g., BMI (body mass index)) or the size of the region of the body that is being massaged. As another example, the system includes adaptive functionality to map the user's input to UV via a scaling rate, so that the overall output offset (which will be converted back into the Cartesian space for the robotic goal) corresponds generally to the input offset.

As shown in the above, in some embodiments, determining the robotic offset by incorporating body information includes introducing an intermediary conversion to a different space, as the UV space is a way to implicitly incorporate the information about the subject's body (e.g., elevation changes and contours) into the coordinate frame itself.

Cartesian Space Adjustment

In the following embodiments, the interpolation of the Z-axis offset is also determined in the Cartesian space (same space as user input and robotic frame), without converting between different coordinate frames.

Tangent

As one example, suppose a user command via the input device indicating a desired X-offset and Y-offset in a Cartesian space. A model of the body is queried that includes, for each X-Y coordinate of the user's body, a corresponding tangent or tangent plane of the body at that X-Y coordinate. The X-Y offset is applied to determine a new X-Y coordinate (adjusted X-Y coordinate). The tangent or slope of the body relative to that adjusted new X-Y coordinate or point on the body is determined. The corresponding Z-coordinate Cartesian offset is determined using a linear equation in the form of $y=mx+b$ (where m is the slope determined using the body model). That is, a body model is queried that includes an approximation of the tangent at a point on the body's surface. This tangent is used to determine the slope at the current point, which is then used to determine a Z coordinate at the new X and Y coordinates determined based on the offsets from the user commands.

Spline

In the above example, the additional Z-dimension of adjustment was determined based on a tangent. In some embodiments, a spline (e.g., represented as a polynomial function) or combination of splines is used to determine the Z-component of the adjustment. For example, an adjusted X-Y point is determined. A polynomial function or spline function at that point is evaluated to determine the additional Z-dimension of adjustment. The spline functions may be used to approximate the region that the user is adjusting within.

Surface Map with Elevation

As another example, a body model is generated that determines elevation (Z) as a function of X and Y. In this case, the nudge is computed in X-Y Cartesian. A new Z is looked up from the body model, and the updated Z value is used in the robotic Cartesian-space goal. As one example, the surface map is generated by using a point cloud to generate a texture map. The use of a surface map is beneficial, as there may be multiple Z values for a given X,Y coordinate (depending, for example, on which direction the adjustment is being made).

In the above examples, the dimensionality of the hardware offset applied to the next robotic goal is greater than the dimensionality of the user-specified input by incorporating body information. For example, various approximations of the curvature of the body's surface at an adjusted X-Y point are used to determine a Z-height component of a robotic goal. A one-dimensional approximation is to use a tangent, as described above. A higher-dimensional approximation is to use a polynomial approximation. The approximations of the surface of the body model may be increased in complexity, such as by using UV maps, which is a modeling and mapping of the 3D surface of the body.

That is, a first level of approximation is to determine, for a point on the body (e.g., adjusted X-Y coordinate), a tangent or tangent plane. As another example, a set of spline(s)/polynomials may be used. At a next level is the use of a surface map, which in some embodiments is a combination of functions that is used to create an overall map of an area or a region. That is, there are various levels of approximation that map between X, Y, and Z values, where there are various representations of the space of the user at various levels of complexity. The UV map and use of barycentric coordinates is another level of approximation that allows for the system to have an object that wraps around (e.g., to mimic the surface of a user). In some embodiments, the approximations and mappings of the user are tracked and updated as the user moves on the table.

Hardware Feedback and Controller Compensation

In some embodiments, the incorporation of body information is performed at a lower level in hardware (and not when determining robotic goals, as described above). For example, after a goal (adjusted in the X-Y plane according to the user's input, but not necessarily adjusted in the Z-axis) is received, compensation may be performed by hardware controllers.

As one example, the compensation (offsetting of the arm physically) is performed based on detection of unexpected force. The detection of unexpected force, or of a change in force beyond a threshold from a previous amount of force is a form of body information, as it is an indication that the end effector is, for example, running into the body rather than along its surface. In some embodiments, upon detecting unexpected resistance, the angle of the application of force (e.g., by the end effector) is adjusted. For example, when an arm encounters more resistance than is expected, the system reacts by tuning the controller to adjust accordingly. As shown in the above example, if more resistance than was expected is encountered, then this is an indication that the X-Y adjustment is causing the end effector or touchpoint to move through the person's body (rather than along its surface, following its curvature). In this case, the controller adapts the Z height to raise the height of where the touchpoint makes contact with the user.

If there is unexpectedly less resistance, then this is an indication to the system that the touchpoint is not in as much contact with the skin as previously, and the controller adapts to be lower.

In the above examples, the feedback from the resistance or the force detected resisting movement causes an update in the command that allows the robot to move in a less inhibited manner.

In some embodiments, there are different control modes when implementing feedback-based (e.g., resistance-based) robotic adjustment via hardware. For example, one control mode is to adjust based on position.

In other embodiments, the motors of the robotic device are adjusted by issuing torque commands (without explicitly indicating position at any given time). For example, when unexpected resistance is encountered (which can be either more than expected, or less than expected, or a change in detected resistance beyond a threshold deviation), the overall torque is adjusted. That is, the adjustment need not be in the operational space of position, but may also be implemented by adjusting torque terms directly.

Ultimately, all adjustments are made by controlling current and torque of the motors in the robotic device. However, the adjustments may be computed or implemented at various levels, as shown above, where there may be some adjustments that occur that are not in a positional space. For example, suppose a user would like to have a certain amount of force applied at a certain location in some direction. The user is able to make real time adjustments to any of the force, location, and/or direction. Ultimately, the adjustments are converted into torque commands to the robotic device, where there is a funnel of information into torque, where adjustments can be made either to torque, or at a higher level, to values that will ultimately be converted to torque commands. For example, force may be adjusted instead of position, or vice versa, and both adjustments would result in an impact to torque. In other embodiments, torque may be adjusted directly.

Touchpoint Orientation

In the above examples, body information was incorporated into the robotic goal adjustment to determine an additional dimension of goal adjustment beyond the X-Y dimensions of the user input. The following is another example of a dimension of a robotic goal that is determined based on a user-input adjustment command and incorporated body information. In this example, an orientation of the touchpoint is determined.

The touchpoint is the element or object of the robotic arm that ultimately makes contact with the person, where a certain part of the touchpoint will interact with the user's body. If the robotic device is nudged without changing the orientation of the touchpoint, depending on the surface of the body, the translation will change the point of contact, where a different part of the touchpoint will touch the user's body.

Figure 11:
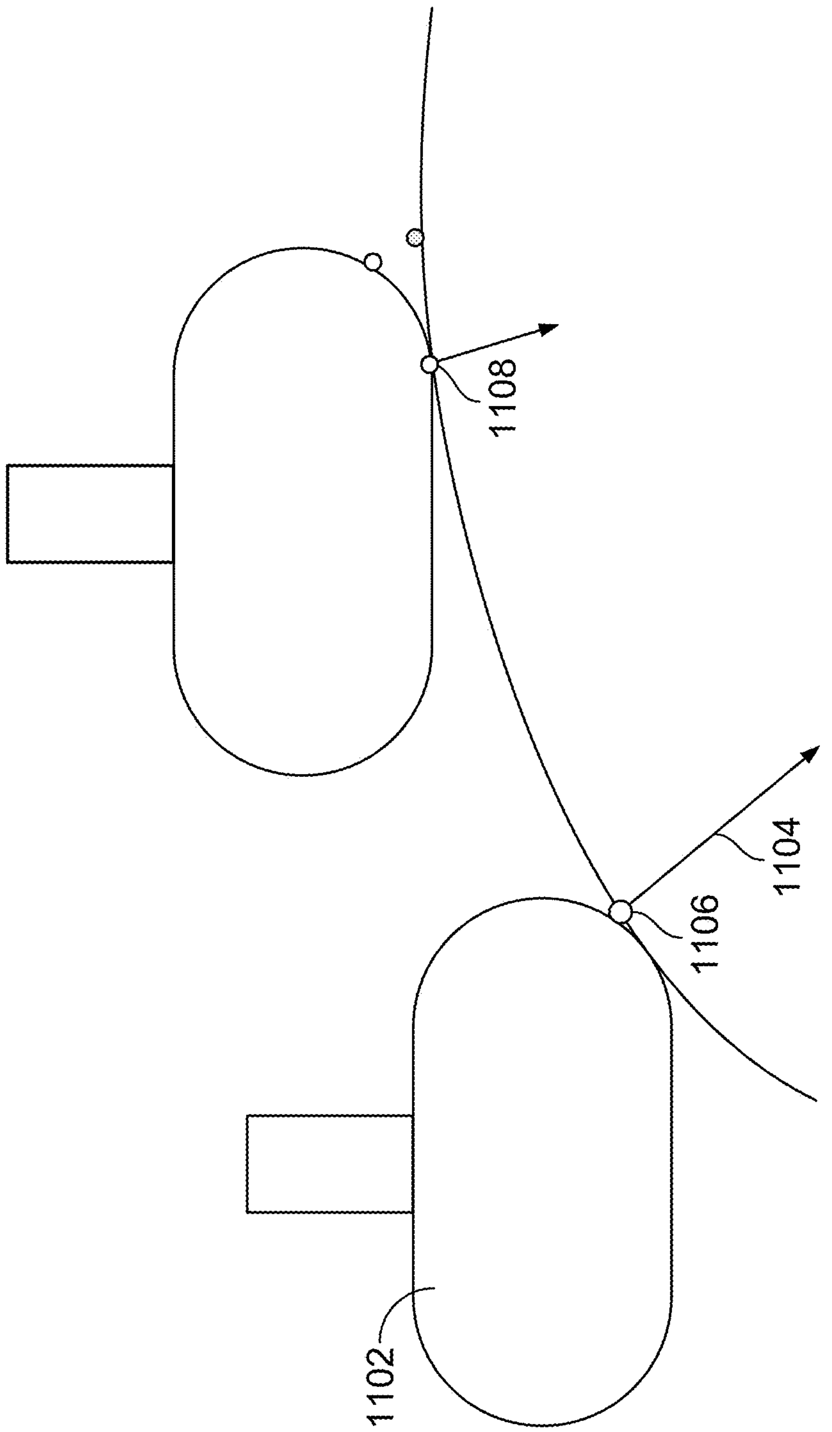
FIG. 11 illustrates an embodiment of touchpoint orientation relative to subject surface.

FIG. 11 illustrates an embodiment of touchpoint orientation relative to subject surface. In this example, a change in the point of contact between the touchpoint/end effector 1102 and the user's body due to robotic device translation is shown. As shown in this example, when the robotic device is nudged, the point of contact of the touchpoint will slide along the surface, and force the touchpoint into the person's body.

For example, if the orientation of the touchpoint were not adjusted (and only the X, Y, and Z coordinates were adjusted), and a force vector were applied as shown at 1104, into the body, then if the orientation were not adjusted, then the point of contact on the end effector will now change from being point 1106 to point 1108 on the end effector.

In some cases, if the orientation of the touchpoint is not adjusted relative to the surface of the body, there may be scenarios in which the massage content itself is being changed (e.g., because the type of massage being requested is no longer being provided after adjustment, due to a change in the manner in which force is now being applied because of the adjustment).

For example, the orientation of the touchpoint is determined based on a frame of information that includes a position, and a direction that force is applied in, which may be relative to the surface of the body, or relative to a location within the body. For example, the direction of force applied may be relative to an internal landmark, such as a muscle inside of the body.

In some embodiments, when the user indicates that they would like to nudge the robotic device, the relationship between the touchpoint and the body is maintained. For example, adjusting a robotic goal includes adjusting the orientation and directionality of force of the touchpoint. In this way, in addition to adjusting a robotic goal in X, Y, and Z axes, the orientation is also adjusted. The direction of force is also adjusted to match. In some embodiments, the adjustment of the orientation of the touchpoint and the direction of force of the touchpoint are determined based on an evaluation of body information. In some embodiments, the orientation and direction of force of the touchpoint are determined relative to the surface of the body or a structure in the body or on the body.

For example, suppose a stroke that is targeting a particular muscle. Now suppose that the user has requested to nudge the robotic device by providing a user command via an input device. In this example, the vector (orientation and force of the touchpoint) is adjusted relative to the muscle (which is one example of body information used to perform an adjustment).

The following are additional embodiments regarding user adjustment of robotic massage.

In some embodiments, as described above, a trajectory is represented as a series of points/goals. When a user requests to nudge the trajectory, the corresponding point/goal is identified and adjustments are made to generate updated goals.

In another embodiment, rather than being represented as a series of points, the trajectory is implemented as a function, such as a spline function. When the user makes an adjustment in the graphical interface (e.g., by clicking, grabbing, and dragging the UI representation of the trajectory), the spline function is updated to an adjusted spline function based on the user's input. The individual goals are then computed based on the updated spline function.

In some embodiments, the user input adjustment is in two dimensions, and a mapping (that incorporates body information) is used to map the 2D input into a higher dimension adjustment. In some embodiments, the stroke is represented in the system as a UV stroke trajectory. To display the stroke in the user interface, a 2D projection of the UV stroke trajectory is displayed. Via the user interface, the user can then adjust the stroke on the unwrapped model of their body. The user command is then received as a UV magnitude offset, which is then converted into Cartesian space for modifying the next robotic goal.

In addition to offsetting hardware via height and touchpoint orientation, rotation and force are other example dimensions of hardware adjustments that are determined based on the user's input and incorporated body information.

As shown in the examples described herein, using embodiments of the techniques described herein, offsetting of robotic hardware for massage is determined based on information about the body, such as its curvatures, contours, underlying structure, etc. As one example, the techniques described herein may be used to determine control commands that are sent to the hardware to offset its position in a manner that follows the body's elevation changes, or otherwise take into account the body's contours when determining how the robotic arm should be adjusted relative to the subject's requested adjustment.

For example, using body information, a user's two dimensional input is translated into a hardware offset that is controlled in three dimensions or more. For example, while the user offset is specified in a 2D cartesian space, the robotic goal is offset or modified in a higher number of dimensions. For example, the robotic goal's position is determined in 3D cartesian space (additional Z component). That is, the dimensionality of the definition of a robotic goal is higher than the dimensionality of the user-specified offset. As one example, the robotic goal has a similar structure or representation to that of a Cartesian pose, which includes the position in three dimensions, as well as orientation. The robotic goal definition also includes parameters for wrench (forces and torques), joint posture, stiffness, etc.

Forward Propagation of User Adjustments

In some embodiments, the adjustments made by a user during a massage are propagated forward and used to influence subsequent massages. For example, if the user is making an adjustment, there is typically a purpose for making that adjustment. For example, suppose a treatment is being performed to work out a trigger point, or to work on the erectors. These are examples of therapeutic goals of a massage stroke.

Suppose the user makes an adjustment to the trajectory. The robotic massage system is configured to recognize the adjustment from the original trajectory, and in some embodiments determine a reason for the adjustment. For example, if the user adjusts the position of a stroke that is to work on the erectors, then this is an indication to the system that the original understanding of the erectors on this user is off by the amount of adjustment. This information is propagated forward into other strokes so that in the future, such that the next time the robotic massage system operates on that muscle or that area, the robotic massage system's trajectory will be positioned to where the user had previously adjusted the robotic massage system, and not where the system had previously determined was the position of the muscle or trigger point. In some embodiments, during the initial massage, this data is held in the trajectory adjustor and stored with metadata from the stroke about the target muscle(s) or region(s) that the adjustments impacted. In some embodiments, this data is also recorded using the bag_recorder (230), uploaded to the cloud using the/monitored_data_uploader (232), analyzed offline, and then provided back to the robot as part of the user profile via the/user_data_provider (234) in the architecture shown in the example of FIG. 2.

Information is also saved between visits or usage of the robotic massage system. As one example, suppose that trigger point work is being done, where the robotic massage system is being used to work out the knots in their back. In some embodiments, the robotic massage system records where the user had been worked out, and which areas of the body the user had requested the robotic massage system to work on for the most amount of time. Such adjustments are retained and utilized the next time that a similar stroke is being performed.

This facilitates placeable treatment and placeable work, allowing the robotic massage system to determine, for focused work, more precisely where on the user's body the robotic hardware should be positioned. In this way, the robotic massage system is configured to record where focused work is being applied (according to feedback from the user), as well as how the user progressed through the treatment. The robotic massage system thus learns the exact points where the user may require more treatment (e.g., because they are frequently stiff in specific areas). Further, if the user adjusts pressure, the robotic massage system also propagates the pressure information to future robotic massage sessions as well.

The embodiments of user adjustment of robotic massage described herein allow intelligent user control of robotic massage that also takes into account context such as the user's surface, an underlying understanding of the muscle structure, the techniques and pressures appropriate for certain areas of the body, clinical presentations, etc. The robotic massage techniques described herein are improvements over existing robotic massage systems, which do not take into account such context, and are unlikely to provoke the therapeutic benefits associated with massage.

Using the learning techniques described herein, the robotic massage system learns to adapt to the preferences and needs of the user, and provides a personalized routine.

The aforementioned embodiments of techniques for facilitating user adjustment of robotic massage further improve efficiency and personalization of robotic massage that becomes progressive as more and more robotic massage sessions are completed.

In addition to forward propagating learned positional information, adjustments to other massage parameters may also be recorded and utilized in future massages. For example, in subsequent sessions, the robotic massage system increases or decreases default pressure for each segment if there were adjustments in the previous massage or interaction session. In some embodiments, the robotic massage system uses the pressure value setting at the end of the segment if the user made many adjustments during the segment. In some embodiments, in subsequent sessions, the robotic massage system increases default stroke repetitions if the participant extended the segment in the previous session.

In some embodiments, insights and information from other users are aggregated to determine how to implement strokes and robotic massage. By facilitating communication between the robotic massage system and the user (e.g., by taking in the user's commands via the input device and reacting by adjusting the robotic hardware, and learning the user's preferences over time), while the user may make some initial adjustments in their first session, over time, subsequent robotic massage systems become auto-play experiences. For example, by learning from the user, the robotic massage system is configured to develop a more personalized routine.

In this way, the experience for the user becomes more efficient over time by applying previous adjustments to the next session. In some embodiments, the advanced in-massage adjustments described herein allow the robotic massage system to exceed the traditional experience for the user who wants to take fine-grained control of their treatment.

Using the techniques described herein, participants can make further settings adjustments after the massage starts without interrupting treatment. In some embodiments, the participant is provided in-massage controls to accommodate real-time reaction to work being performed.

The automated recording and learning from previous sessions and propagation of information to influence future sessions has various benefits, as described above, and provides an efficient adaptive massage experience.

For example, current, existing practice requires a medical practitioner or therapist to produce, from memory, detailed notes after each treatment if the patient is to have consistent, efficient care.

In some embodiments, the robotic massage system described herein automatically records all work performed, as well as patient adjustments. In subsequent sessions, patients can choose to replay prior treatment without needing to re-perform the exploratory strokes. Given that trigger points may become active or inactive, shift location, or vary in severity from session to session, patients may instead choose to view the location(s) of prior trigger points on a visual representation of their body to inform where they would like to focus their session explorations, rather than replay the exact treatment from a previous session. In some embodiments, over time, the system synthesizes patient behavior with an anatomical model and aggregated data from similar patients to rely less on explicit patient input and anticipate pain locations, touch preferences, and other treatment parameters. With the adaptive experience described herein, treatment efficiency is improved with each session. In some embodiments, the robotic massage system performs predictive adjustments to the treatment experience based on analysis of the individual user's profile and behavior as well as the actions of similar users.

The user may provide other types of inputs when performing a robotic massage session, such as indicating a goal, the purpose for using the robotic massage system (e.g., type of desired treatment), indications of specific pains, etc. The user may also indicate their preferences, such as the areas of the body they would like to work on. The user may also provide input about any treatment adaptations they would like to request for this robotic massage system. For example, the user may enjoy deep pressure, but indicate they have swelling in certain areas. Based on this, the robotic massage system adapts the robotic massage plan to avoid delivering deep pressure in swollen areas. As another example, the user may indicate an area to avoid, such as a region in which a new tattoo had been put on. The massage system will then adapt the massage plan to avoid the indicated region with the tattoo. This allows a more personalized routine from the outset of the massage robotic system.

For example, beyond recording and replaying strokes, the robotic massage system described herein is configured to take into account, into its programming and hardware control, the intent of the stroke being performed, the purpose of why the stroke is being performed, the user's preferences, as well as determine how to deliver a therapeutic benefit through control of the hardware in a safe and effective manner that also feels natural.

Figure 12:
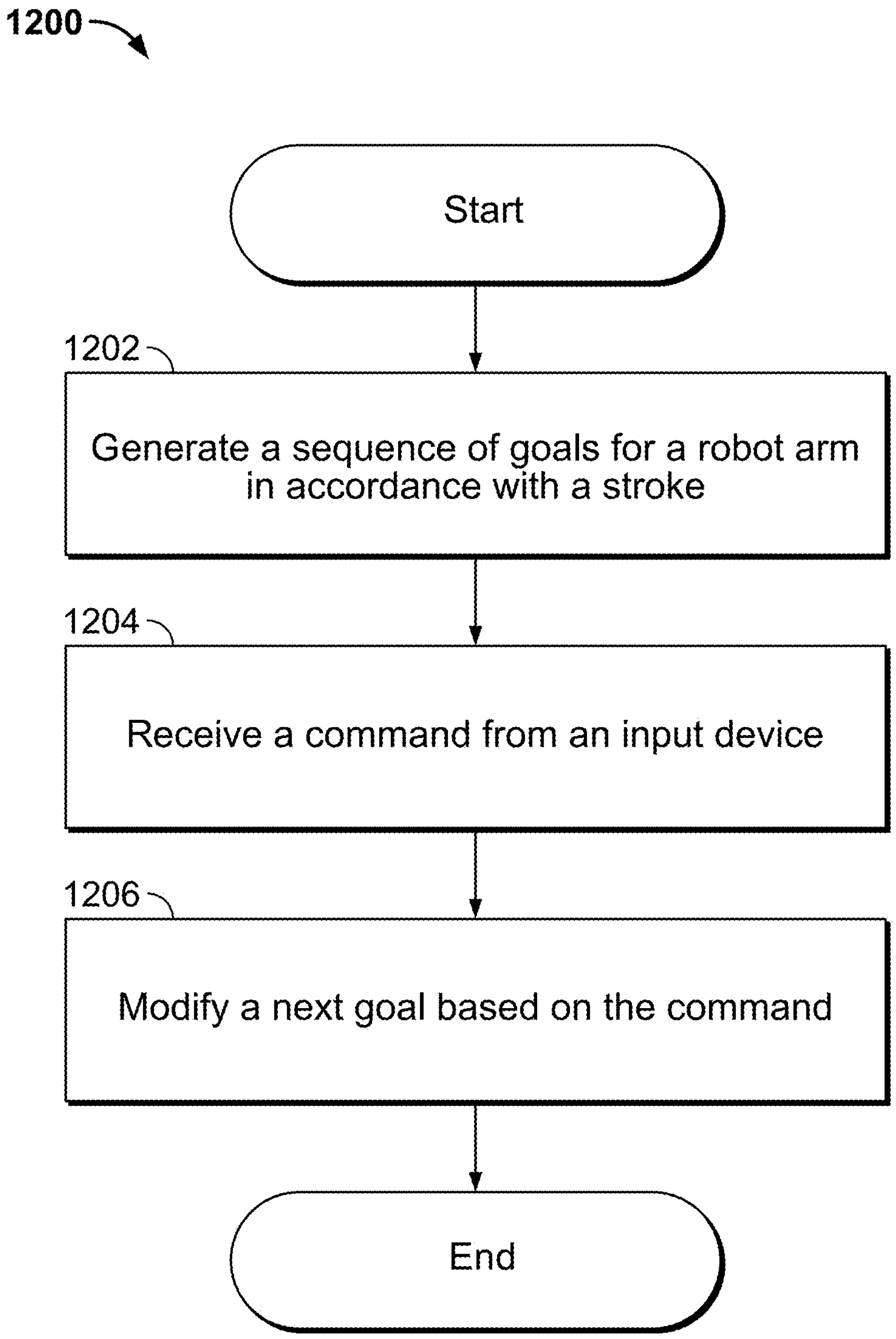
FIG. 12 is a flow diagram illustrating an embodiment of a system for adjusting a robotic massage.

FIG. 12 is a flow diagram illustrating an embodiment of a system for adjusting a robotic massage. In some embodiments, process 1200 is executed by the robotic massage system of FIG. 2, such as by a controller such as command manager 224. The process begins at 1202, when a sequence of goals for a robot arm is generated in accordance with a stroke. In some embodiments, the sequence of goals is continuously generated. For example, the robotic goals may be generated at frequencies such as 5 Hz, 10 Hz, 30 Hz, etc. The stroke, in accordance of which the sequence of goals is generated, may be a user defined-stroke, or one that is generated by the robotic massage system.

At 1204, a command is received from an input device. For example, a user-desired planar offset is received via an input device such as a tablet, as described above. At 1206, a next goal is modified based on the command. That is, the controller generates a sequence of goals, is able to receive a user command, and then modifies the next goal based on the command. In some embodiments, the next goal is generated based on the command received from the input device. In some embodiments, the next goal is also generated based on information about a subject of the robotic massage. For example, the user command is received via the user input device. Body information about the user is obtained. Both the user command received via the input device and the body information are used together to determine modification of the next goal. For example, the body information is used to determine boundaries or limits of permitted adjustments of the next goal. As another example, the body information (in conjunction with the user command, which in some embodiments indicates a user requested amount of offset) is used to determine or interpolate various dimensions of robotic goal modification, where the modification is specifiable in a variety of dimensions. As one example, the body information is used to determine robotic goal adjustments in dimensions beyond the dimensions of the user's input. For example, while the user's commands may be specified in a plane (e.g., X and Y axis), the robotic arms are also adjusted in the Z-axis, where the determination or interpolation of the Z-axis adjustment to the robotic goal is based on the information about the user. That is, for example, the user indicates a two-dimensional, X-Y adjustment. The system takes the 2D user input, and also incorporated information about the user's body, to determine a Z-height adjustment, resulting in a three-dimensional (3D) robotic goal offset. Various ways of incorporating information about the body of the user to determine a robotic offset are described in further detail above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:

a first robotic arm associated with a first end effector;

a second robotic arm associated with a second end effector;

an input device; and a controller that continuously generates a sequence of goals for the first robotic arm in accordance with a trajectory, wherein the controller is configured to receive a command from the input device and selectively modify a next goal of the first robotic arm based at least in part on the command, wherein the first end effector interacts with a deformable body based at least in part on the modifying of the next goal, and wherein selectively modifying the next goal of the first robotic arm comprises preventing collision between the first robotic arm and the second robotic arm at least in part by:

determining positions of the first end effector associated with the first robotic arm and the second end effector associated with the second robotic arm; and constraining an allowed amount of offset of the next goal of the first robotic arm based at least in part on the determined positions of the first and second end effectors.

2. The robotic system of claim 1, wherein the controller is further configured to determine whether the next goal is eligible for modification.

3. The robotic system of claim 1, wherein the controller is further configured to determine a permissible boundary of modification for the next goal.

4. The robotic system of claim 1, wherein the command comprises a planar user-specified adjustment.

5. The robotic system of claim 1, wherein the controller is further configured to selectively modify the next goal based at least in part on information associated with a body of a subject.

6. The robotic system of claim 5, wherein the information associated with the body of a subject comprises one or more representations of the body of the subject.

7. The robotic system of claim 6, wherein the controller is configured to selectively modify the next goal at least in part by converting between at least some of the one or more representations of the body of the subject.

8. The robotic system of claim 5, wherein the controller is configured to selectively modify the next goal at least in part by querying a representation of the body of the subject.

9. The robotic system of claim 5, wherein the information associated with the body comprises resistance encountered at least in part by the first end effector, and wherein the controller is configured to selectively modify the next goal based at least in part on the encountered resistance.

10. The robotic system of claim 1, wherein the controller is further configured to generate a second sequence of goals for the second robotic arm in accordance with the trajectory.

11. The robotic system of claim 10, wherein based at least in part on the command received from the input device, the controller is configured to selectively modify next goals of one or both sequences of goals.

12. The robotic system of claim 11, wherein the controller is configured to modify the next goals of both sequences of goals to follow each other.

13. The robotic system of claim 11, wherein the controller is configured to mirror modifications to the next goals of both sequences of goals.

14. The robotic system of claim 11, wherein the controller is configured to limit modification to one of the next goals.

15. The robotic system of claim 1, wherein the controller is configured to transition between goals based at least in part on one or more thresholds.

16. The robotic system of claim 15, wherein the one or more thresholds comprise a maximum permitted velocity, a maximum permitted acceleration, a maximum permitted jerk, or a maximum permitted change in force over time.

17. The robotic system of claim 1, wherein the controller is configured to transition between goals at least in part by injecting an interpolated goal.

18. The robotic system of claim 1, wherein the next goal is implemented at least in part by issuing a torque command.

19. The robotic system of claim 1, wherein interaction with the deformable body in a subsequent interaction session is configured based at least in part on the command.

20. A method, comprising:

continuously generating a sequence of goals for a first robotic arm in accordance with a trajectory;

receiving a command from an input device; and selectively modifying a next goal of the first robotic arm based at least in part on the command received from the input device, wherein a first end effector associated with the first robotic arm interacts with a deformable body based at least in part on the modifying of the next goal, and wherein selectively modifying the next goal of the first robotic arm comprises preventing collision between the first robotic arm and a second robotic arm at least in part by:

determining positions of the first end effector associated with the first robotic arm and a second end effector associated with the second robotic arm; and constraining an allowed amount of offset of the next goal of the first robotic arm based at least in part on the determined positions of the first and second end effectors.

21. A computer program product embodied in a non-transitory computer readable medium and comprising computer instructions for:

continuously generating a sequence of goals for a first robotic arm in accordance with a trajectory;

receiving a command from an input device; and selectively modifying a next goal of the first robotic arm based at least in part on the command received from the input device, wherein a first end effector associated with the first robotic arm interacts with a deformable body based at least in part on the modifying of the next goal, and wherein selectively modifying the next goal of the first robotic arm comprises preventing collision between the first robotic arm and a second robotic arm at least in part by:

determining positions of the first end effector associated with the first robotic arm and a second end effector associated with the second robotic arm; and constraining an allowed amount of offset of the next goal of the first robotic arm based at least in part on the determined positions of the first and second end effectors.

* * * * *